United States Patent
Dalton et al.

(10) Patent No.: US 10,977,573 B1
(45) Date of Patent: Apr. 13, 2021

(54) DISTANTLY SUPERVISED WRAPPER INDUCTION FOR SEMI-STRUCTURED DOCUMENTS

(71) Applicant: Google Inc., Mountain View, CA (US)

(72) Inventors: Jeffrey Dalton, San Mateo, CA (US); Karthik Raman, Mountain View, CA (US); Evgeniy Gabrilovich, Sunnyvale, CA (US); Kevin Patrick Murphy, Palo Alto, CA (US); Wei Zhang, Redwood City, CA (US)

(73) Assignee: Google LLC, Mountain View, CA (US)

( * ) Notice: Subject to any disclaimer, the term of this patent is extended or adjusted under 35 U.S.C. 154(b) by 1271 days.

(21) Appl. No.: 15/130,089

(22) Filed: Apr. 15, 2016

Related U.S. Application Data

(60) Provisional application No. 62/158,461, filed on May 7, 2015.

(51) Int. Cl.
  *G06N 20/00* (2019.01)
  *G06F 16/80* (2019.01)
  *G06F 40/169* (2020.01)

(52) U.S. Cl.
  CPC ............. *G06N 20/00* (2019.01); *G06F 16/80* (2019.01); *G06F 40/169* (2020.01)

(58) Field of Classification Search
  CPC ........ G06F 16/80; G06F 40/169; G06N 20/00
  See application file for complete search history.

(56) References Cited

U.S. PATENT DOCUMENTS

| | | |
|---|---|---|
| 7,650,317 B2 | 1/2010 | Basu et al. |
| 8,352,386 B2 | 1/2013 | Chitiveli et al. |
| 8,504,490 B2 | 8/2013 | Nie et al. |
| 8,725,666 B2 | 5/2014 | Lemmond et al. |

(Continued)

OTHER PUBLICATIONS

Augenstein, Isabelle, Diana Maynard, and Fabio Ciravegna. "Relation extraction from the web using distant supervision." International Conference on Knowledge Engineering and Knowledge Management. Springer, Cham, 2014. (Year: 2014).*

(Continued)

*Primary Examiner* — Benjamin P Geib
(74) *Attorney, Agent, or Firm* — Brake Hughes Bellermann LLP

(57) ABSTRACT

Systems and methods provide distantly supervised wrapper induction for semi-structured documents, including automatically generating and annotating training documents for the wrapper. Training of the wrapper may occur in two phases using the training documents. An example method includes identifying a training set of semi-structured web pages having a subject entity that exists in a knowledge base and, for each training page, identifying target objects, identifying predicates in the knowledge base that connect the subject entity to a target objects identified in the training page, and annotating the training page. Annotating a training page includes generating a feature set for a mention of the target object, generating predicate-target object pairs for the mention, and labeling each predicate-target object pair with a corresponding example type and weight. The annotated training pages are used to train the wrapper to extract new subject entities and new facts from the set of semi-structured web pages.

21 Claims, 12 Drawing Sheets

(56) References Cited

U.S. PATENT DOCUMENTS

| | | |
|---|---|---|
| 2011/0093452 A1 | 4/2011 | Jain et al. |
| 2014/0075299 A1 | 3/2014 | Ain et al. |
| 2015/0019460 A1 | 1/2015 | Simard et al. |
| 2016/0098645 A1* | 4/2016 | Sharma ................ G06N 20/00 706/12 |

OTHER PUBLICATIONS

Dong, Xin, et al. "Knowledge vault: A web-scale approach to probabilistic knowledge fusion." Proceedings of the 20th ACM SIGKDD international conference on Knowledge discovery and data mining. 2014. (Year: 2014).*

Min, Bonan, et al. "Distant supervision for relation extraction with an incomplete knowledge base." Proceedings of the 2013 Conference of the North American Chapter of the Association for Computational Linguistics: Human Language Technologies. 2013. (Year: 2013).*

Krause, Sebastian, et al. "Large-scale learning of relation-extraction rules with distant supervision from the web." International Semantic Web Conference. Springer, Berlin, Heidelberg, 2012. (Year: 2012).*

Surdeanu, Mihai, et al. "Multi-instance multi-label learning for relation extraction." Proceedings of the 2012 joint conference on empirical methods in natural language processing and computational natural language learning. Association for Computational Linguistics, 2012. (Year: 2012).*

Hoffmann, Raphael, et al. "Knowledge-based weak supervision for information extraction of overlapping relations." Proceedings of the 49th Annual Meeting of the Association for Computational Linguistics: Human Language Technologies—vol. 1. Association for Computational Linguistics, 2011. (Year: 2011).*

Bunescu, Razvan, and Raymond Mooney. "Learning to extract relations from the web using minimal supervision." Proceedings of the 45th Annual Meeting of the Association of Computational Linguistics. 2007. (Year: 2007).*

Bollacker, et al., "Freebase: A Collaboratively Created Graph Database for Structuring Human Knowledge", SIGMOD '08, Jun. 2008, pp. 1247-1249.

Grin, "Extracting Patterns and Relations from the World Wide Web", WebDB '98, 1999, pp. 172-181.

Maven, et al., "Constructing Biological Knowledge Bases by Extracting Information from Text Sources", Proceedings of the Seventh International Conference on Intelligent Systems for Molecular Biology, 1999, pp. 77-86.

Dalvi, et al., "Automatic Wrappers for Large Scale Web Extraction", Proceedings of the VLDB Endowment (PVLDB), vol. 4, No. 4, Jan. 2011, pp. 219-230.

Dalvi, et al., "Robust Web Extraction : An Approach Based on a Probabilistic Tree-Edit Model", 2009 ACM SIGMOD International Conference on Management of Data, Jun. 2009, 13 pages.

Etzioni, et al. "Open Information Extraction from the Web", Commun. ACM, vol. 51, No. 12, Dec. 2008, pp. 68-74.

Etzioni, et al., "Open Information Extraction: The Second Generation", IJCAI'11, 2011, pp. 3-10.

Fader, et al., "Identifying Relations for Open Information Extraction", EMNLP '11, Jul. 2011, pp. 1535-1545.

Furche, et al., "DIADEM: Domains to Databases", Database and Expert Systems Applications, LNCS, vol. 7446, 2012, 8 pages.

Furche, et al., "DIADEM: Thousands of Websites to a Single Database", Proceedings of the VLDB Endowment, vol. 7, No. 14, 2014, pp. 1845-1856.

Galarraga, et al., "AMIE: Association Rule Mining under Incomplete Evidence in Ontological Knowledge Bases", Proceedings of the 22nd International Conference on World Wide Web, 2013, pp. 413-422.

Gentile, et al., "Unsupervised Wrapper Induction Using Linked Data", K-CAP '13, Jun. 2013, 8 pages.

Hachey, et al., "Evaluating Entity Linking with Wikipedia", Artificial Intelligence, vol. 194, 2013, pp. 130-150.

Kushmerick, et al., "Wrapper Induction for Information Extraction", IJCAI-97, 1997, 7 pages.

Kushmerick, "Wrapper Induction: Efficiency and Expressiveness", Artificial Intelligence 118, 2000, pp. 15-68.

Mintz, et al., "Distant Supervision for Relation Extraction Without Labeled Data", Proceedings of the Joint Conference of the 47th Annual Meeting of the ACL and the 4th IJCNLP of the AFNLP, Aug. 2009, pp. 1003-1011.

Riedel, et al., "Modeling Relations and Their Mentions without Labeled Text", ECML PKDD 2010, Part III, LNAI 6323, 2010, pp. 148-163.

Ritter, et al., "Modeling Missing Data in Distant Supervision for Information Extraction", Transactions of the Association for Computational Linguistics, vol. 1, Oct. 2013, pp. 367-378.

Soderland, et al., "CRYSTAL: Inducing a Conceptual Dictionary", IJCAI'95, May 9, 1995, pp. 1314-1319.

Soderland, "Learning Information Extraction Rules for Semi-Structured and Free Text", Machine Learning 34, 1999, pp. 233-272.

Suchanek, et al., "YAGO: A Core of Semantic Knowledge Unifying WordNet and Wikipedia", 16th International Conference on World Wide Web, May 2007, 10 pages.

* cited by examiner

200 bigbashboard.com/player/piyush-chawla

BigBashBoard.com

Rankings — Statistics — Teams — Players — Matches — Tourname

Piyush Chawla

205

M ○ 24th December 1998 | India | All-Rounder | Left-Hand Batsman

Teams: | India (7) | Kings X1 Punjab (86) | Kolkata Knight Riders (11), Sunssex Sharks (2), Uttar Pradesh

210

215

| 114 | 67 | 26 | 597 | 39* | 484 | 123.35 | 14.56 | - | 2 |
|---|---|---|---|---|---|---|---|---|---|
| Mat | Inn | NO | Runs | HS | Balls | SR | Ave | - | 30 |
|  |  |  |  |  |  |  |  | 100 | 50 |

| Overview > | ● Batsman ranking > | ○ Bowler ranking > |

305 http://www.imdb.com/title/tt0033870/

Maltese Falcon (1941) ⟵ 310

[NR] 100 min – Crime – Drama – Film-Noir

A private detective takes on a case that involves him with three eccentric criminals, a gorgeous liar, and their quest for a priceless statuette. ⟵ 315

Director: John Huston

Writers: John Houston (screenplay), Dashiell Hammett (based upon the novel by)

Stars: Humphrey Bogart, Mary Astor and Gladys George

Watch Trailer | + Watch list ▶

330

Top 250 #111 | Nominated for 3 Oscars, Another 1 win See more awards >>

Edit

Cast
Complete credited cast:

| | Humphrey Bogart ⟵ 320 | Samuel Spade ⟵ 325 |
| | Mary Astor | Brigid O'Shaughnessy |
| | Gladys George | Iva Archer |
| | Peter Lorre | Joel Cairo |

FIG. 3

← → C 🗋 www.nfl.com/teams/roster?team=WAS

WASHINGTON REDSKINS

4th NFC EAST (4-12-0)  
Http//www.redsktns.com/  
Founded: 1932  
Stadium: FedExField  
Tickets: 301-276-6800|Find Tickets  
Watch Washington Redskins Games Online  
See full NFL Play Off Schedule  
Shop: Get Redskins Gear  
Game Averages (214)  
Offense | defense | more 📶 Subscribe

| PTS | YDS | PASS YDS | RUSH YDS |
|---|---|---|---|
| 18.8 | 358.6 | 252.9 | 105.7 |
| (26th) | (13th) | (11th) | (19th) |

(league rank)

Profile   Stats   Schedule   Roster   Depth Chart   Trans   Injuries   Coaches

WASHINGTON REDSKINS

| No | Name | Pos | Status | Height | Weight | Birthdate | Exp | College |
|---|---|---|---|---|---|---|---|---|
| 39 | Aaitui, Isaako | NT | ACT | 6'4" | 307 | 1/25/1987 | 2 | Nevada-Las Vegas |
|  | Amerson, David | CB | ACT | 6'1" | 205 | 12/8/1991 | 3 | North Carolina State |
| 92 | Baker, Chris | NT | ACT | 6'2" | 325 | 10/8/1987 | 4 | Hampton |
| 90 | Beauharnais, Steve | LB | ACT | 6'2" | 230 | 5/2/1990 | 2 | Rutgers |
|  | Bell, Braylon | WR | ACT | 6'6" | 205 | 8/24/1986 | 0 | Abilene Christian |
| 26 | Breeland, Bashoud | CB | ACT | 5'11" | 197 | 1/30/1992 | 2 | Clemson |
|  | Bridget, Courtney | DB | ACT | 6'3" | 195 | 3/22/1991 | 2 | Hampton |
|  | Campbell, Jordan | FB | ACT | 5'11" | 240 | 6/29/1988 | 1 | New Mexico Highlands |
| 66 | Chester, Chris | G | ACT | 6'3" | 203 | 1/12/1983 | 10 | Oklahoma |
| 25 | Clark, Ryan | FS | ACT | 5'11" | 205 | 10/12/1979 | 14 | LSU |

FIG. 12

DISTANTLY SUPERVISED WRAPPER INDUCTION FOR SEMI-STRUCTURED DOCUMENTS

RELATED APPLICATIONS

This application is a non-provisional of, and claims priority to, U.S. Provisional Application No. 62/158,461, filed May 7, 2015, entitled "Distantly Supervised Wrapper Induction for Semi-Structured Web Pages," the disclosure of which is incorporated herein in its entirety.

BACKGROUND

Large-scale knowledge bases, such as the FREEBASE knowledge base and YAGO knowledge base store data and rules that describe knowledge about the data in a form that provides for deductive reasoning. For example, in a knowledge base, entities, such as people, places, things, concepts, etc., may be stored as nodes and the edges between nodes may indicate the relationship between the nodes. In such a knowledge base, the nodes "Maryland" and "United States" may be linked by the edges of in country and/or has state. The basic unit of such a knowledge base is a tuple that includes two entities and a relationship between the entities. Some tuples are also referred to as <subject, predicate, object> tuples. A tuple may represent a real-world fact, such as "Maryland is a state in the United States." The tuple may also include other information, such as context information and other metadata. Adding entities and relationships to a knowledge base has typically been a manual process, making the creation of large knowledge bases difficult and slow. Thus, while the knowledge base may include information about millions of entities, the knowledge base may still be incomplete. Such missing entities and relationships reduce the usefulness of querying the knowledge base.

SUMMARY

Implementations provide robust systems and methods for distantly supervised wrapper induction for semi-structured documents. A wrapper is an extraction engine that can map data in a document to a set of data items. Wrapper induction is a way of learning (generating) a wrapper from a set of labeled examples. The wrapper, once generated, is an extraction engine that can extract information from a web page. But labeling examples by humans (supervised learning) is time consuming. Thus, implementations automatically generate and annotate training documents in a distantly supervised manner and use the training documents to induce the wrapper. This may also be referred to as training the machine-learning extraction model. The trained extraction model can then be used to identify new entities and new facts for a knowledge base from other similarly semi-structured documents.

Implementations may take as input a document source and an entity type or a group of related entity types (e.g., a collection). In some implementations, the input may also include a vertical. The vertical represents a general area (e.g., movies, baseball, cricket, national parks). In some implementations, the document source may be specified as a regular expression of a uniform resource locator (URL). The document source represents a set of documents that share a similar, but not necessarily identical, structure (e.g., are semi-structured). The document source may identify a location where documents with a similar structure can be found. In some implementations, the repository identifier may be a domain, a URL pattern, a directory name, etc. Implementations may use one or more knowledge bases to identify and annotate training documents from the repository. The annotations include positive as well as negative examples. The negative examples may include various levels of certainty, represented by a weight. The various levels of certainty may be adjusted via a bootstrapping training process. Once the model is trained, implementations may run the model against pages in the document source that were not used as training pages, extracting new entities and new facts for insertion into the knowledge base.

In one aspect, a method includes identifying, from a set of semi-structured web pages, a training set of the semi-structured web pages, a semi-structured web page in the training set being a training page and having a subject entity that exists in a knowledge base. The method also includes, for each training page in the training set, identifying target objects in the training page, identifying predicates in the knowledge base that connect the subject entity of the training page to one of the target objects identified in the training page, and annotating the training page. Annotating the training pages includes, for at least some target objects identified in the training page, generating a feature set for a mention of the target object, generating predicate-target object pairs for the mention, and labeling each predicate-target object pair with a corresponding example type and weight. The method also includes training, using the annotated training pages, a machine-learning model to extract new subject entities and new facts from the set of semi-structured web pages.

In one aspect, a system includes at least one processor and memory storing a training set generation engine. The training set generation engine may be configured to identify, from a set of semi-structured web pages for a domain, a training set of the semi-structured web pages, a semi-structured web page in the training set being a training page and having a subject entity that exists in a knowledge base. The training set generation engine may also be configured to, for each training page in the training set, identify target objects in the training page, identify predicates in the knowledge base that connect the subject entity of the training page to one of the target objects identified in the training page, and annotate the training page by generating predicate-target object pairs for at least some target object mentions, wherein each predicate-target object pair is one of a positive example type, a probable negative example type or a weak negative example type. The memory may also store a wrapper induction engine configured to train, using the annotated training pages, an extractor model and a missing fact generation engine configured to use the trained extractor model on non-training pages in the domain to extract new subject entities and new facts from the set of semi-structured web pages.

In one aspect, a method includes dividing a set of training pages into a first set and a second set, training a first model using the first set, training a second model using the second set, running the first set through the second model to obtain probabilities for features in the first set, and running the second set through the first model to obtain probabilities for features in the second set. The method also includes adjusting weights of the features according to the probabilities and training a final model using the training pages with adjusted weights.

In another aspect, a computer program product embodied on a computer-readable storage device includes instructions that, when executed by at least one processor formed in a substrate, cause a computing device to perform any of the disclosed methods, operations, or processes disclosed herein.

One or more of the implementations of the subject matter described herein can be implemented so as to realize one or more of the following advantages. As one example, the system may enable automatic identification of new entities and of facts about the new entities and facts about existing entities to add to existing knowledge bases. Implementations provide highly robust learning with a high recall due to robustness to label noise. As another example, differentiating between different kinds of negative examples in the training pages allows for handling missing labels and incomplete knowledge base predicates. Using bootstrapped training of the model with iterative reweighting of the different categories of negative examples also enables the model to more accurately identify informative entity mentions and ignore less useful, possibly incorrect, mentions. As another example, because the annotation of training pages is automatic, the methods and systems are easily scalable and wrappers can easily be kept up-to-date. As another example, leveraging document source knowledge from the knowledge base improves extraction effectiveness by fixing incorrect entity links and enforcing document source consistency constraints.

The details of one or more implementations are set forth in the accompanying drawings and the description below. Other features will be apparent from the description and drawings, and from the claims.

BRIEF DESCRIPTION OF DRAWINGS

FIG. 2 illustrates an example of a single entity semi-structured web page in a domain for a sports vertical.

FIG. 3 illustrates an example of a single entity semi-structured web page in a domain for an entertainment vertical.

FIG. 12 illustrates an example of a multiple entity semi-structured web page in a domain for a sports vertical.

Like reference symbols in the various drawings indicate like elements.

DETAILED DESCRIPTION

Figure 1:
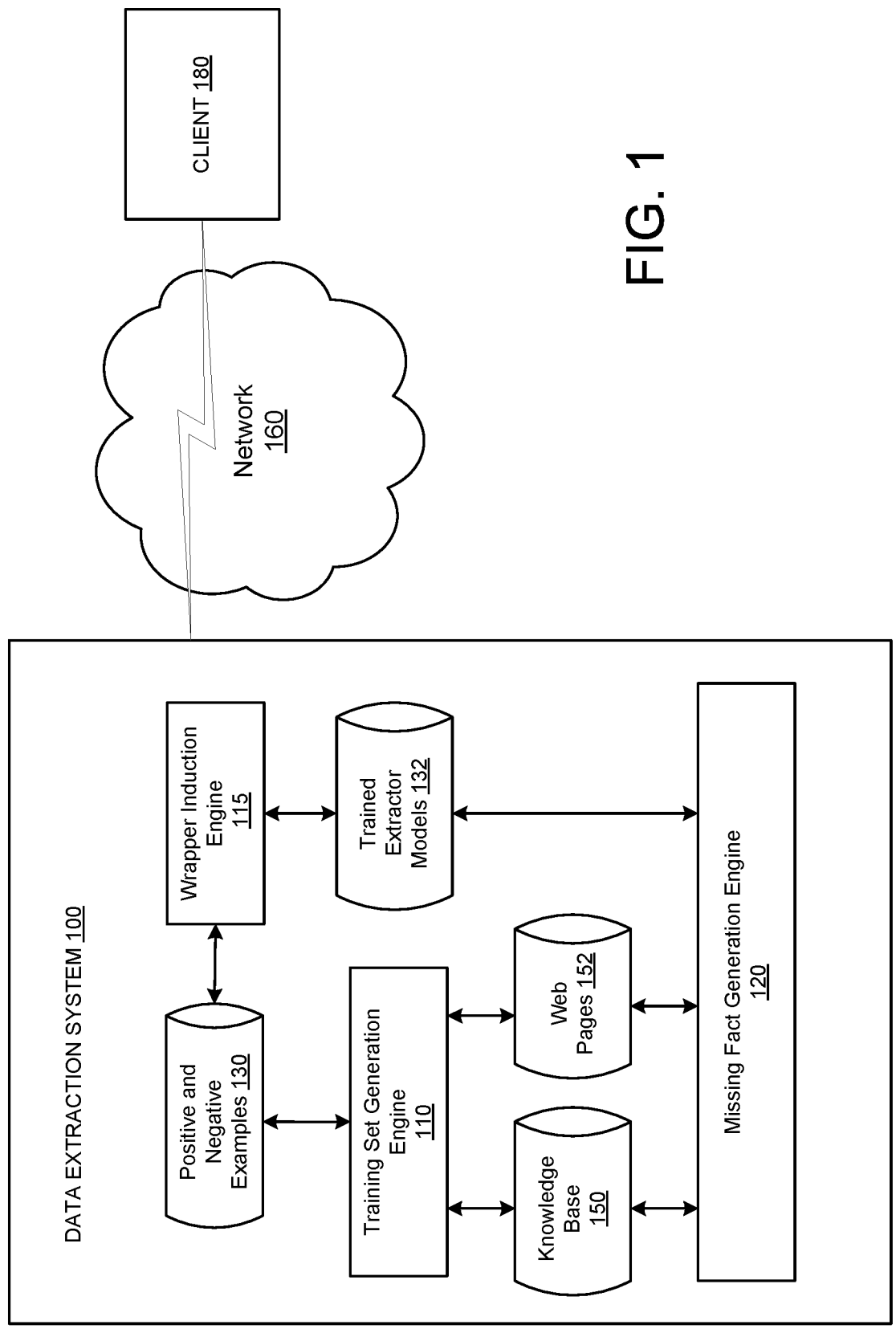
FIG. 1 illustrates an example system in accordance with the disclosed subject matter.

FIG. 1 is a block diagram of an automatic wrapper induction system in accordance with an example implementation. The system 100 may be used to automatically generate high-quality annotated documents used to train an extraction engine for semi-structured web pages in a distantly supervised manner. The extraction engine may be used to identify new entities and new facts about entities to expand a knowledge base. Because the systems and methods described result in a trained extraction model with almost no input from a human user, the systems and methods are scalable and can be used to train many extraction models, which can significantly enhance the knowledge represented in the knowledge base. The depiction of system 100 in FIG. 1 is described as a system for annotating entity-centric semi-structured web-based documents. However, other configurations and applications may be used. For example, the source documents need not be web-based. As another example, the term document or page may refer to a well defined section of information that occurs in a single physical file. In other words, rather than a document focusing on many attributes of one entity, the semi-structured documents may include a few attributes for many entities, with each section within the document being considered as an independent page.

Figure 10:
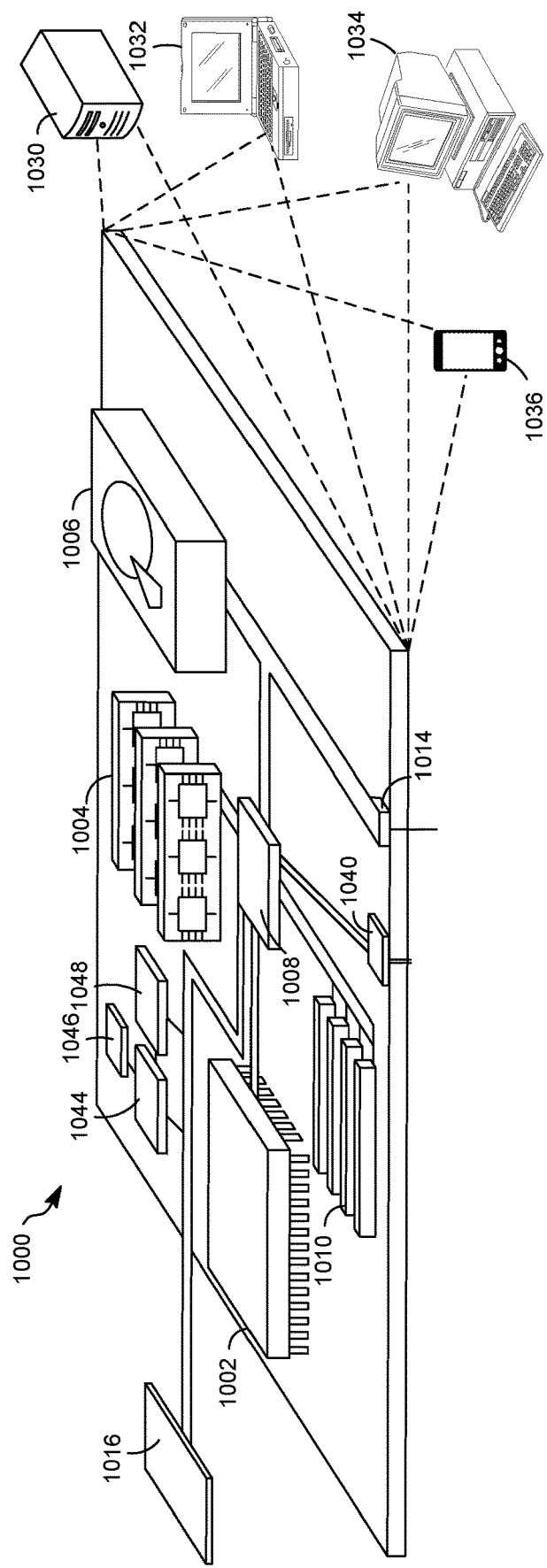
FIG. 10 shows an example of a computer device that can be used to implement the described techniques.
Figure 11:
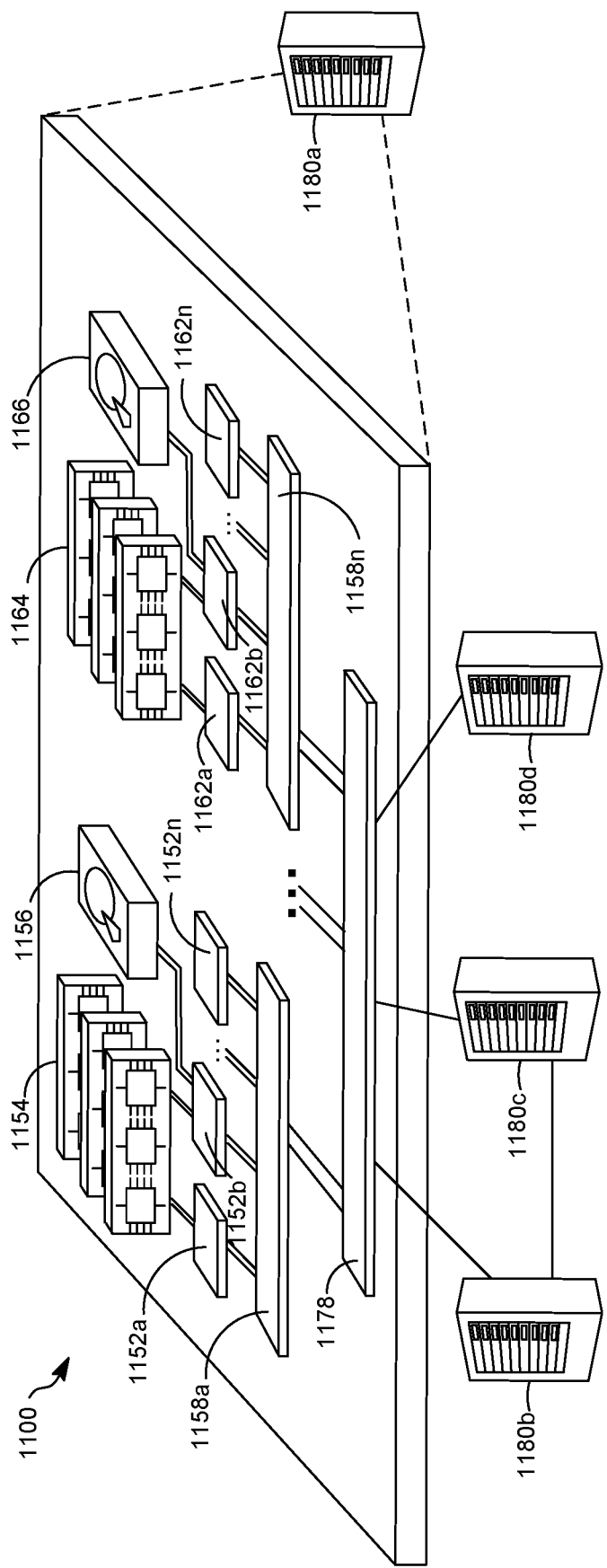
FIG. 11 shows an example of a distributed computer device that can be used to implement the described techniques.

The automatic wrapper induction system 100 may be a computing device or devices that take the form of a number of different devices, for example a standard server, a group of such servers, or a rack server system. In addition, system 100 may be implemented in a personal computer, for example a laptop computer. The automatic wrapper induction system 100 may be an example of computer device 1000, as depicted in FIG. 10 or computer device 1100, as depicted in FIG. 11.

The automatic wrapper induction system 100 may include a graph-structured knowledge base 150. Such a knowledge base conventionally stores information (facts) about entities. Entities may represent a person, place, item, idea, topic, abstract concept, concrete element, other suitable thing, or any combination of these, and may be represented by a node in the knowledge base. Entities in the knowledge base may be related to each other by edges. The edges may represent relationships between entities, i.e., facts about entities. For example, the data graph may have an entity that corresponds to the actor Humphrey Bogart and the data graph may have an acted in relationship between the Humphrey Bogart entity and entities representing movies that Humphrey Bogart has acted in. In some implementations, the facts may be stored in a tuple, such as <Humphrey Bogart, acted in, Maltese Falcon>. A tuple may be considered to have a subject, predicate, object format, with the first entity representing the subject, the relationship the predicate, and the last entity the object. A knowledge base with a large number of entities and even a limited number of relationships may have billions of connections. In some implementations, knowledge base 150 may be stored in an external storage device that is accessible from system 100, for example via a network connection.

Although not shown in FIG. 1, the automatic wrapper induction system 100 can include one or more processors formed in a substrate configured to execute one or more machine executable instructions or pieces of software, firmware, or a combination thereof. The processors can be semiconductor-based—that is, the processors can include semiconductor material that can perform digital logic. The automatic wrapper induction system 100 can also include an operating system and one or more computer memories, for example a main memory, configured to store one or more pieces of data, either temporarily, permanently, semi-permanently, or a combination thereof. The memory may include any type of storage device that stores information in a format that can be read and/or executed by the one or more processors. The memory may include volatile memory, non-volatile memory, or a combination thereof, and store modules that, when executed by the one or more processors, perform certain operations. In some implementations, the modules may be stored in an external storage device and loaded into the memory of system 100.

The modules may include a training set generation engine 110, a wrapper induction engine 115, and a missing fact generation engine 120. The training set generation engine 110 may receive as input a semi-structured document source and an entity type or collection of related entity types and, using this input, generate training pages for the document source annotated with positive and negative examples. The annotated training pages with positive and negative examples may be stored in memory, for example in positive and negative 130. The document source may represent a set of semi-structured documents, for example, semi-structured web pages of a particular domain. In some implementations, the web pages of a domain may be web pages with a URL that matches a regular expression for the domain. Accordingly, in some implementations, the document source may be a sub-set of web pages 152. Web pages 152 may represent any documents accessible via the Internet. The document source may be identified via a URL, or uniform resource locator, for example, www.foo.net or www.foo.net/*people/. In some implementations, the training set generation engine 110 may take a set of document sources for a topic or vertical. A vertical (i.e., topic) may represent a category that relates various document sources. For example, a video game vertical may be represented by a first set of document sources and a baseball player vertical or entertainment vertical may be represented by a second set of document sources. While the document sources in these verticals may not have the same structure, the types of facts about entities in the vertical are similar and, as will be discussed herein, information obtained from a first document source (e.g., a first domain) can be helpful in annotating other document sources in the vertical. Thus, a vertical is not necessary, but can improve the wrapper induction process and quality of facts extracted by the wrapper. Of course the document source may be a non-Internet source of semi-structured documents. For example, the document source may be accessible only via an intranet or other private network, and the documents need not be web pages. However, each document in the document source should have a similar structure.

In some implementations, the documents in the document source (e.g., web pages in the domain) include a plurality of profile pages. In other words, at least some of the web pages include information (e.g., facts) about a single entity or information about multiple entities in well-defined segments with one main entity per segment. Thus, a profile page can refer to an entire document or a segment within an entire document. In some implementations the plurality of profile pages may include many entities having a particular fact. The profile pages may be semi-structured in the sense that they are often generated using a template and, thus, include similar information in a similar format for the subject entity. FIG. 2 illustrates one example of a profile page for a document source in a sports vertical. FIG. 3 illustrates another example of a profile page in a document source for an entertainment vertical.

The training set generation engine 110 may use the document source (e.g., domain) and entity type(s) to identify training pages from among the documents in the document source. A training page is a document that 1) has at least one main entity that matches the entity type(s) from the parameters and 2) where the entity exists in the knowledge base 150. In other words, the training page may have one main entity per page, or one main entity per segment in a single page. Entities and entity attributes in a document may be identified using conventional entity identification techniques (entity linking). Entity identification may use natural language processing tools, such as part-of-speech tagging, dependency parsing, noun-phrase extraction, and coreference resolution. The training set generation engine 110 may then estimate the topicality of each entity. The main entity may be the most topical entity. The topicality score may be based on location of the entity in the title or the URL of the page or the segment. The training set generation engine 110 may then determine whether the main entity exists in the knowledge base. If it does not, the page is not a training page, but may be used for extraction later, or may be used in a test set. If the entity is in the knowledge base, and of the correct entity type (or types), the training set generation engine 110 may consider the page a training page. Of course, not all pages with a main entity of the correct entity type that exists in the knowledge base may become annotated with training examples. As discussed herein, the training set generation engine 110 may filter out some of these pages.

The training set generation engine 110 may then identify seed facts for the main entities. In other words, given a semi-structured web page for a first main entity, the training set generation engine 110 may identify target objects in the semi-structured web page. Target objects can be any entity type, including dates, measures, names, etc. The target objects may be identified using the natural language processing tools that support entity linking. The training set generation engine 110 may explore the neighborhood of the main entity in the knowledge base to determine facts known about the main entity, for example by determining the paths in the knowledge base that connect the main entity to the target objects identified in the document for the main entity. The training set generation engine 110 may do this for each training document. In other words, the training set generation engine 110 may, starting from each main entity in the knowledge base, traverse the edges in the knowledge base to determine which edges end at a target object found in the document. In some implementations, the training set generation engine 110 may use a maximum path length of two to explore the neighborhood. It is possible that some main entity-target object pairs have more than one path in the knowledge base. For example, a person may have played for and coached for the same team. The training set generation engine 110 may look for all paths between the subject entity and a target object, not just stop once one path is found.

In some implementations, the training set generation engine 110 may use paths in the neighborhood of the main entity to identify target objects in the training document. For example, the natural language processing techniques used in entity linking may not identify or resolve some target objects in the document. To create a more robust extraction system, the training set generation engine 110 may use string matching on the names of known relationships in the knowledge base to identify target objects on the training document. Thus, the training set generation engine 110 may use the paths to find target objects.

The training set generation engine 110 may aggregate the paths across the training documents. For example, after the training set generation engine 110 finds the paths in the knowledge base that link a first subject entity (i.e., main entity) with target objects in a first semi-structured training document, the training set engine may determine the number of times the same path links other main entities with other target objects. This can occur across all target pages in a document source (e.g., a domain) or across all target pages in a vertical. The training set generation engine 110 may filter out (or discard) paths that do not occur with sufficient frequency. For example, when a path fails to meet or exceed a frequency threshold the path may be discarded. In some implementations, the threshold may be based on a percentage of the training pages. For example, in some implementations, if a path appears in 10% of the training pages in the domain, the path may fail to meet the threshold. In some implementations, the path must appear a minimum number of times across the training pages or the training set generation engine 110 may consider the path too infrequent. The minimum number of times may be adjusted and may depend on the structural complexity of the webpage and the machine learning algorithm used. In some implementations, the aggregation may occur across the vertical, not just the domain. Thus, a path that does not occur with sufficient frequency in the domain, may occur with sufficient frequency in the vertical. The paths that occur with sufficient frequency may be referred to as seed paths, or seed facts.

In some implementations, the training set generation engine 110 may optionally filter the target pages based on the seed facts. For example, if a particular target page does not include a sufficient number of seed facts for the main entity, the training set generation engine 110 may remove the page from the training pages. This is because the page may be considered noise that is not helpful in training the extraction engine.

The training set generation engine 110 may then annotate the training documents (or the training pages left after filtering) to generate positive and negative training examples. Automatically labeling examples is difficult because there are no obvious negative training examples. While a fact (e.g., a tuple) that exists both on the training page and in the knowledge base is a positive example, a fact on the training page that does not match the knowledge base may reflect incompleteness in the knowledge base, not an incorrect fact. In addition, the target object mentions may be ambiguous. For example, as illustrated in FIG. 2, India may represent the citizenship of the player as well as a team the player plays for. The relationship between each target object with the main entity is different for the different object mentions. For example the plays for relationship should only apply to the team, not the country, while the citizen of relationship should only apply to the country, not the team. Similarly, a target object mention in a training page does not always relate to the main entity. For example, when a training page includes free text, the target object may be mentioned in the text in a context unrelated to any of the seed facts. For example, if the semi-structured page of FIG. 2 included free text that mentioned a particular game played in Delhi, India, the mention of India in the free text is not related to the subject entity by any of the seed facts. All of these examples represent noise that the training set generation engine 110 needs to address.

To annotate the training pages, the training set generation engine 110 may map target objects to the page context. In other words, each target object may be mapped to the mention of the object in the training page. Of course, because of entity ambiguity, it is possible that one mention may be mapped to two target objects (if the ambiguity cannot be resolved sufficiently). In addition, two entities may be mapped to overlapping mentions. For example, the text "south africa" may be linked to the entity representing the country of South Africa and the "africa" portion of "south africa" may be linked to an entity for the continent of Africa. The training set generation engine 110 may also generate features for each mention. Features are based on the web page itself and describe the context of the entity mention, where in the page the mention occurs, any identifiers associated with the mention, etc. For example, the string itself may be a feature, the string context may be a feature, the document object model (DOM) node for the object may be a feature, the DOM siblings may be features, etc. The training set generation engine 110 may determine how often each feature occurs over the set of training pages and drop features that do not occur with sufficient frequency. In some implementations, the features may be derived from positive examples only.

The training set generation engine also generates predicate-target object pairs for the entity mentions. The predicate-target object pairs represent the cross product of every seed fact that expects an entity type corresponding to the target object. In other words, a born on predicate expects a date entity for the target object and it makes no sense to pair this predicate with a target object that is a person entity type. However, the predicate may be paired with each date target object on the training page. Thus, if the seed facts include born on, died on, and released, each date target object found on a training page may be paired with each of these three seed facts. Similarly, a directed by predicate may expect a person entity type, as does a played by predicate and a married to predicate. Each target object that represents a person may be paired with the directed by, married to, and played by predicates, generating three predicate-target object pairs. The predicate-target object pairs are mapped to a target mention and, thus to a set of features.

The target set generation engine 110 may then label each predicate-target object pair. The label indicates whether the predicate-target object pair is a negative or positive training example. To address the noise discussed above, the training set generation engine 110 may classify the training examples and assign a confidence score or weight to each of the training examples. The weight may be initially based on the class of the training example, with probable negative examples having a high weight and less certain or weak negative examples having a low weight. Positive examples may be given a highest weight.

In some implementations, the training set generation engine 110 may use five different classifications or labels. The first classification may be for positive examples. Positive examples may represent a predicate-target object pair for a main entity that exists in the knowledge base. In other words, the main entity→predicate→target object represents a tuple that exists in the knowledge base. A predicate may link the main entity to another entity or to an entity attribute, for example a single-value attribute like a date. Such positive examples may be labeled as positive and assigned a highest weight, for example 1.0. Next, the training set generation engine 110 may determine and label known negative examples. A known negative example occurs when a predicate-target object pair contradicts a fact in the knowledge base. This occurs when the seed fact (i.e., the predicate) is functional, or in other words can have only a single value object. Such examples that contradict the knowledge base may be classified as negative and given a high weight. For example, as explained above, every date in a training page may be paired with the born on predicate. But only one of the dates match what is in the knowledge base. The matching born on-target object is a positive example and any other born on-target object pairs are categorized as known negative examples. Known negative examples may also be given a high weight (e.g., at or close to 1.0).

The training set generation engine 110 may then look for and label probable negative predicate-target object pairs. A probable negative occurs when a training page contains a positive example for two different predicate-target object pairs. The training set generation engine 110 can assume that a tuple with the predicates switched is probably a negative example. For example, if the tuples <Sue, born in, England> and <Sue, died in Ireland> are both on the same training page and are positive examples (e.g., the tuples exist in the knowledge base), the training set generation engine 110 may guess that Sue was not born in Ireland. In other words, born in-Ireland is a probable negative. Similarly, the training set generation engine 110 may assume that Sue did not die in England. This may not always be correct, but it represents a reasonable assumption. Thus, the weight for probable negatives may be high (e.g., at or close to 1.0).

The training set generation engine 110 may also look for uncertain negative predicate-target object pairs. An uncertain negative is a weak negative label (or classification) used for one-to-many predicates. For example, an actor entity may have many acted in relationships, for example one for each role the actor played. Thus, the discrepancy of an acted in-target object pair with a tuple in the knowledge base does not necessarily mean the pair is incorrect. The training set generation engine 110 may label a predicate-target object pair as an uncertain negative when the instance (i.e., the target object mention) has not been labeled as positive for any other predicate and other instances (i.e., other target object mentions) on the training page are marked as positive examples for the predicate. For example, if a sports profile page includes five team names and three of the team name mentions match facts (tuples) in the knowledge base, the remaining two team name mentions may be labeled as uncertain negatives. The weight for an uncertain negative may depend on the number of facts the knowledge base includes for the subject-predicate. For example, if the knowledge base includes eight teams for a player and the training page includes two additional teams, the weight of the two additional teams may be larger than if the knowledge base only includes two teams, and the training page mentions two additional teams. In some implementations, the weighting function may be expressed as $1-e^{-cn}$, where c is low (e.g., 0.2) and n is the number of entries in the knowledge base for the subject-predicate.

Another label the training set generation engine 110 may use is a not-missing-not-found label. For example, as indicated above the training set generation engine 110 may obtain all seed facts from the knowledge base for the subject entity. If a seed fact exists in the knowledge base but is not found on the page (e.g., has no matching mention), the training set generation engine 110 may consider this a weak negative. The predicate-target object pair is weak because there may have been an entity resolution error or alias problem that prevented the correct identification of the fact on the training page. The weight for a not-missing-not-found label may also be low, for example 0.1.

In some implementations, the training set generation engine 110 may use all training pages for the same entity in a vertical to determine when a particular predicate-target object pair is incorrect. For example, if a vertical includes three training pages with Sue as the subject entity, the training set generation engine 110 may use a voting scheme to determine which single value facts on the training pages are correct. In some implementations, when Sue is a subject entity on three training pages, the training set generation engine 110 may decrease the weight of a fact that appears in all three training pages but not appear in the knowledge base, or change the label on such a fact from negative to positive. As another example, if the three pages each indicate Sue acted in a particular role or movie, the system may label these as positive examples rather than uncertain negative.

As another example, the training set generation engine 110 may extract several compatible positive examples across a vertical for a given subject entity, and may weight more specific facts more highly. Thus, if the predicate-target object pairs for a particular entity include <born in, Australia> and <born in, Sydney> the training set generation engine 110 may lower a weight of the more general (<born in, Australia>) for a positive example. As another example, the training set generation engine 110 may use repository compatibility to adjust the weights. For example, in a basketball domain birthdates for players do not reach much before the 20th century, when the game was invented. Because of this, a birth date prior to the 20th century would be highly unlikely given the overall distribution of birthdates for players. Thus, a fact that appears to make a birth date outside the overall distribution can be adjusted to reflect the likelihood that the fact is false. In addition, other external knowledge systems can be used to estimate the likelihood of a fact.

If a predicate-target object pair cannot be labeled with one of the labels above, it may be labeled as missing. A missing label is another type of uncertain negative and may be given a low weight (e.g., 0.0.1).

In some implementations, the training set generation engine 110 may adjust the weight assigned to a predicate-target object pair by a confidence factor. In some implementations, this may occur when the same predicate-entity pair appears multiple times (i.e., with different mentions) on the training page. Each instance represents the same fact (same subject-predicate-object) and the system may adjust the weight to favor the most confident instance. The confidence factor may represent a confidence that the entity linking is correct. For example, as previously discussed, the system may use an entity linking engine to identify the target objects in the training page. The entity linking may include a confidence score for each possible target object. For example, the text India may refer to the country or a team. The entity linking may give a first confidence score with the country entity and a second confidence score with the team entity, based on the context. In some implementations, the training set generation engine 110 may adjust a weight based on the confidence score. The confidence score may have a value between one and zero inclusive.

As one example, the predicate-target object pair of born in—India may be associated with two different entity mentions on a training page. The first mention may have a confidence of $c_1$ and the second mention may have a confidence of $c_2$. In some implementations, the training set generation engine may adjust the weight of the born in-India pair for the first mention according to $$\frac{w_1 c_1}{c_1 + c_2}$$

where $w_1$ is the weight assigned to the pair based on the label for the mention (e.g., positive, uncertain negative, missing, etc.). Similarly, the training set generation engine may adjust the weight of the born in-India pair for the second mention according to $$\frac{w_1 c_2}{c_1 + c_2}.$$

The training set generation engine 110 may thus automatically generate various training examples for each page. These training examples may be stored in the positive and negative examples 130. The positive and negative examples 130 may be used to train a set of binary classifiers (one per predicate).

The automatic wrapper induction system 100 may also include a wrapper induction engine 115. The wrapper induction engine 115 may use the positive and negative training examples 130 to train the extractor model 132, generating the wrapper. In some implementations the wrapper induction engine 115 may use conventional training techniques. In some implementations, the wrapper induction engine 115 may use a bootstrapping training method that includes iteratively re-weighting the negative examples. For example, the wrapper induction engine 115 may divide the training pages into a first group and a second group and use the first group to train a first model and the second group to train a second model. The wrapper induction engine 115 may then run the second model on the training pages in the first group and run the first model on the training pages in the second group. The result of running the models is a probability for each labeled training example. The wrapper induction engine 115 may adjust the weights assigned to some predicate-target object pairs based on the probabilities. For example, if the born in-India pair occurs three times on the page, each instance receives a probability. If the probability for a first mention is less than or equal to 50% but the probability for another mention is greater than 50%, the wrapper induction engine 115 may set the weight of the first mention to zero. This is because another mention on the page is more relevant. If the probability of the first mention is greater than 50% the system may normalize the weights of all positive (greater than 50%) examples. Any non-positive (less than 50% are set to zero. If no mention is positive, the system may normalize the weight over all mentions. In some implementations, the reweighting may be expressed as $$w_i = \begin{cases} 0 & \text{if } p_i \leq 0.5 \text{ and } \exists\, p_j > 0.5 \\ \dfrac{p_i}{\sum_{j: p_j > 0.5} p_j} & \text{if } p_i > 0.5 \text{ and } \exists\, p_j > 0.5 \\ \dfrac{p_i}{\sum_j p_j} & \text{otherwise} \end{cases}$$

where $w_i$ is the weight for the instance i, and $p_i$ is the probability for the instance i of the predicate-target object pair and $p_j$ is the probability of another instance j of the predicate-target object pair. The reweighting allows less relevant mentions to fall out.

The wrapper induction engine 115 may repeat the training, running, and reweighting at least a second time. Thus, for example, the first model is trained with the first set of training pages (with reweighted examples) and the second model is trained with the second set of reweighted training pages. The models are then run against the set of training pages used to train the other model, producing a second round of probabilities and the system adjusts the weights of the mentions as described above. The iterative reweighting improves recall significantly. After the second iteration, the system may use the reweighted training pages to train a new model. In other words, the two sets of reweighted training pages are used to train a new model. In some implementations, the system may use a random forest model, although linear and non-linear SVMs and boosted trees can also be used. The wrapper induction results in a trained extractor model 132, which can be run against other documents structured similar to the training pages.

The trained extractor model 132 (or wrapper) is specific to pages with a structure similar to the training pages. In other words, if a vertical has five different document sources (e.g., domains), the automatic wrapper induction system 100 may generate five different wrappers, one for each domain. However, because the wrapper induction is distantly supervised, such generation is fast and can be easily scaled to many domains. In other words, the system 100 has no difficulty generating many trained extractor models 132.

The automatic wrapper induction system 100 may also include a missing fact generation engine 120. The missing fact generation engine 120 may run the trained extractor model 132 (wrapper) against pages in the domain to extract new facts to expand the knowledge base. At an initial time, the pages may include the training pages (as there may be facts on the training pages that were not already in the knowledge base 150 that can now be identified) and any other pages not used as training pages in the domain that fit the template. Later, the wrapper may be used against new pages or updated pages, so that the knowledge base 150 may be kept current. The missing fact generation engine 120 may continue to use the knowledge base 150 to refine the extracted facts and remove errant facts. The missing fact generation engine 120 may also use knowledge about the domain to help identify and remove errant facts. In some implementations, after using the wrapper (trained extractor model 132) to extract facts from the pages in the domain, the missing fact generation engine 120 may group predictions for new facts from the mention-level to the object-level by taking the maximum probability across tuples with the same predicate and object value, but different mentions. The missing fact generation engine 120 may also eliminate functional relations (or predicates that can only have one value) based on prediction probabilities. For example, if the missing fact generation engine 120 finds a <Bob, born in, South Africa> tuple and a <Bob, born in, Italy> tuple, the missing fact generation engine 120 may select the tuple that has a higher probability and discard the other. In some implementations, functional predicates may be identified by computing statistics from the seed fact identification process. In other words, even if the predicate is not functional, it may be functional for the domain because the web pages only list one value of the predicate per page.

In some implementations, the missing fact generation engine 120 may employ subject linking. For example, some of the profile pages may be for an entity not yet in the knowledge base. However, if the subject entity has the same name as an existing entity in the knowledge base, the system may incorrectly identify the mention with the existing entity.

The missing fact generation engine can avoid such a false positive by checking to see if any of the extracted facts from the page conflict with known facts for the candidate subject. When they do conflict, or when enough of them conflict, the missing fact generation engine may assume the entity is new and can add the entity and the extracted facts to the knowledge base.

In some implementations, the missing fact generation engine 120 may enforce non-overlapping constraints. For example, during entity linking the system may have treated the text South Africa as one entity or may have considered south an adjective for Africa. Thus, the system may identify the entity South Africa corresponding to "South Africa" and Africa corresponding to just "Africa". Because the two entities overlap, the missing fact generation engine 120 may, if the probability associated with each is the same, break a tie by picking South Africa because it spans more text.

Automatic wrapper induction system 100 may be in communication with client(s) 180 over network 160. Clients 180 may allow a user to provide parameters to the training set generation engine 110 and direct the training and/or evaluation of the extractor models 132. Network 160 may be for example, the Internet or the network 160 can be a wired or wireless local area network (LAN), wide area network (WAN), etc., implemented using, for example, gateway devices, bridges, switches, and/or so forth. Via the network 160, the automatic wrapper induction system 100 may communicate with and transmit data to/from clients 180. In some implementations, automatic wrapper induction system 100 may be in communication with or include other computing devices that provide updates to the knowledge base 150 and web pages 152. For example, automatic wrapper induction system 100 may include or be in communication with an indexing engine that crawls web servers for documents and indexes the contents of the documents. Automatic wrapper induction system 100 represents one example configuration and other configurations are possible. In addition, components of system 100 may be combined or distributed in a manner differently than illustrated. For example, in some implementations one or more of the missing fact generation engine 120, the training set generation engine 110, and the wrapper induction engine 115 may be combined into a single module or engine. In addition, components or features of the missing fact generation engine 120, the training set generation engine 110, and the wrapper induction engine 115 may be distributed between two or more modules or engines.

FIG. 2 illustrates an example of a semi-structured web page 200 in a domain for a sports vertical. A domain refers to a source of documents available or generated from the same source. For example, www.example.com represents a domain, but a directory can also be a domain. In some implementations, the domain may include additional paths, such as www.example.com/players/or www.example.com/movies/profiles/ In some implementations, the domain may include a regular expression, like www.example.com/*/profiles. As used herein the domain or document source refers to any identifier used to location documents with similar structure. FIG. 2 is an example of a single entity profile page for a main entity 205. In other words, most of the facts on the page are attributes of the main entity 205 and not other entities. The main entity 205 may be identified as such due to the font size, presence at the top of the information, etc. Example facts illustrated for the main entity 205 include gender, birthdate 210, country of citizenship, position 215, teams that the entity has played for, etc. The main entity 205 may also be referred to as the subject entity in a single entity profile page. The semi-structured web page 200 may be considered semi-structured because the domain (e.g., bigbashboard.com/player/) includes web pages with a similar structure for other entities. In some implementations, such pages are generated using a template. FIG. 12 is an example of another semi-structured web page in a domain for a sports vertical. The example of FIG. 12 is a document that includes multiple profile pages, where each profile page is a defined segment in the document. In other words, the webpage of FIG. 12 has multiple entities per page, with each entity sharing a similar set of attributes. While a single entity profile page is used herein as an example, the automatic wrapper induction system can be modified to work in a similar manner using a web page that includes multiple-entities segmented into multiple profile pages, such as the rows of players in FIG. 12.

FIG. 3 illustrates an example of a semi-structured web page 300 in a domain for an entertainment vertical. FIG. 3 is another example of a single entity profile page for main entity 305. The main entity 305 may be identified in a manner similar to that discussed above with regard to the main entity of page 200 FIG. 2. The web page 300 includes several facts about the main entity 305, such as the director 315, writers, actors 320, characters in the movie 325, etc.

Figure 4:
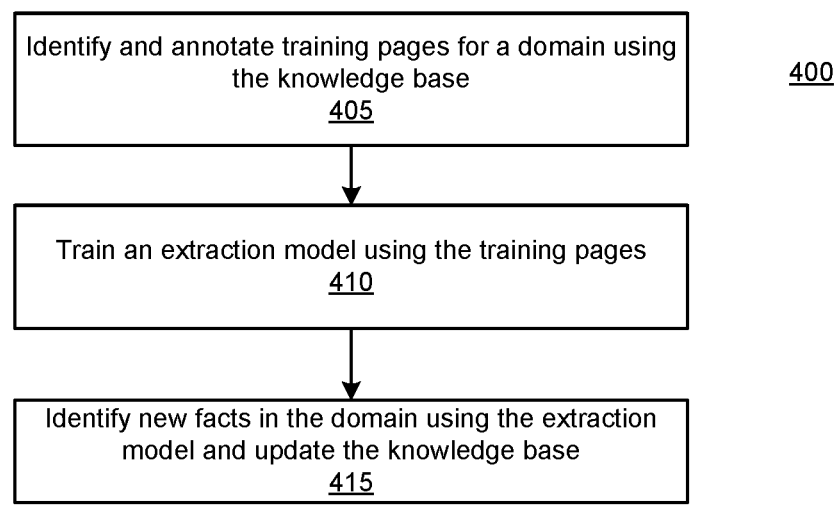
FIG. 4 illustrates a flow diagram of an example process for automatic wrapper induction and use, in accordance with disclosed subject matter.

FIG. 4 illustrates a flow diagram of an example process 400 for automatic wrapper induction and use, in accordance with disclosed subject matter. Process 400 may be performed by an automatic wrapper induction system, such as system 100 of FIG. 1. Process 400 may begin with the automatic wrapper induction system identifying and annotating training pages (e.g., positive and negative examples in training pages) for a document source using information from the knowledge base (405). In some implementations, the system may be provided with a document source and an entity type or collection of related entities and may automatically identify pages in the document suitable for use as training pages and may automatically annotate the training pages with positive and negative examples, as explained in more detail with regard to FIG. 5. As part of annotating the training pages, the system may determine seed facts for the document source, or in other word relationships (links in the knowledge base) that are found in the semi-structured web pages associated with the document source. The system may then use the training pages for wrapper induction, or in other words training an extraction model for the document source (410). In some implementations, the training may use conventional methods. In other implementations, the training may use a bootstrapped method with iterative reweighting of the negative training examples, as explained in more detail with regard to FIG. 9. The trained model (or wrapper) may be used on other similar semi-structured web pages associated with the document source to extract information from those pages (415). In other words, the system may identify new facts that can be added to the knowledge base by using the extraction model on the other semi-structured pages associated with the document source. The facts can be new seed facts for an entity or can even include a new entity. The system may perform step 415 many times after the model has been trained. For example, step 415 may be performed once after the model has been trained and on a periodic basis for new pages added to the document source. The wrapper for the document source may continue to be used to extract new facts from the document source as long as the structure of the semi-structured web pages remains similar.

Figure 5:
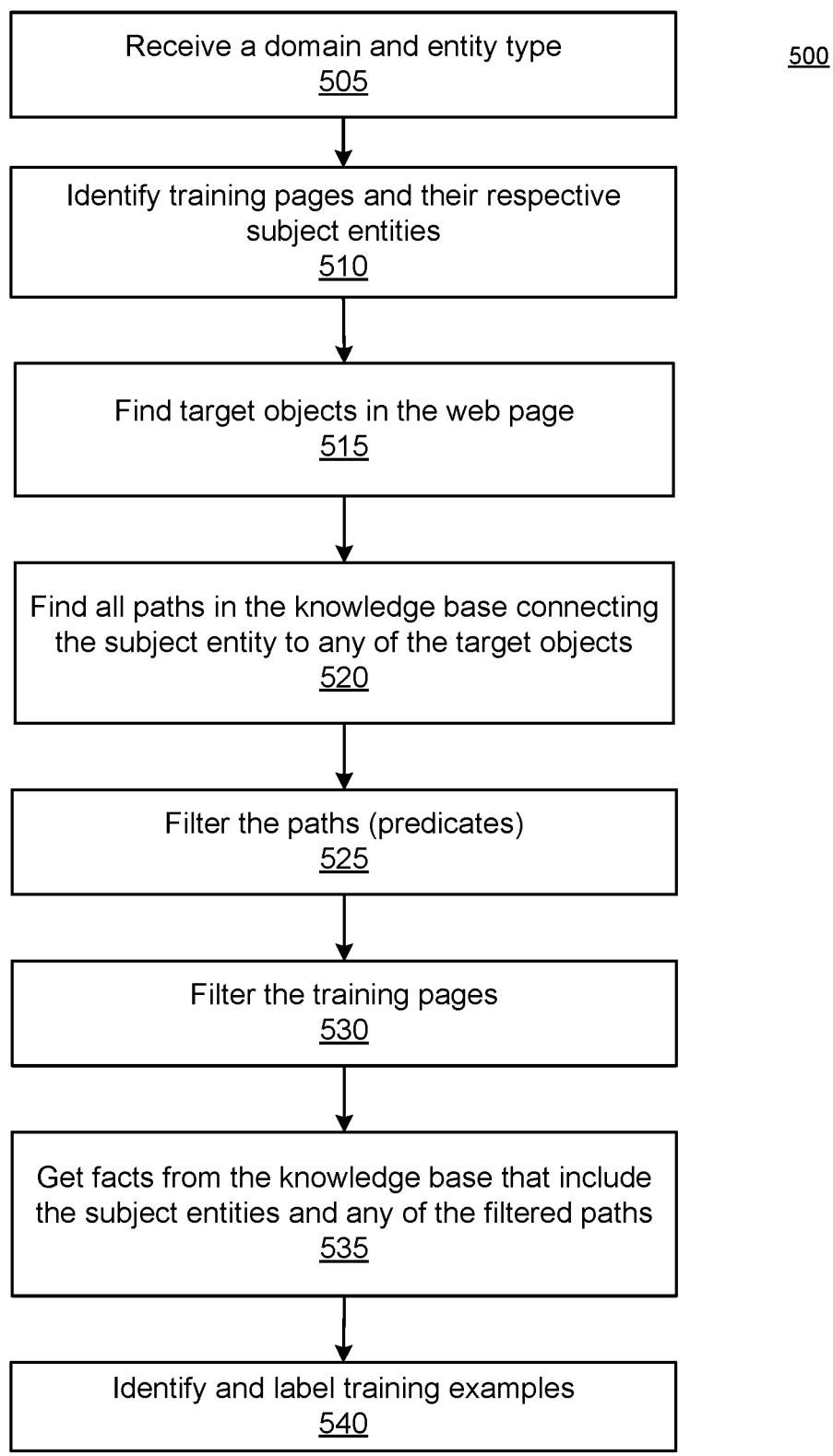
FIG. 5 illustrates a flow diagram of an example process for automatically generating training examples for wrapper induction, in accordance with disclosed subject matter.

FIG. 5 illustrates a flow diagram of an example process 500 for automatically generating training examples for wrapper induction, in accordance with disclosed subject matter. Process 500 may be performed, for example, by a training set generation engine in an automatic wrapper induction system, such as system 100 of FIG. 1. Process 500 may use a knowledge base to identify pages in a document source for which facts are already known, may identify seed facts for the document source, and use this information to annotate the training pages. The seed facts are facts relevant to the document source and, in particular, found across many of the training pages. The training annotations, or examples, may be positive or negative. The negative examples may be categorized or labeled and may be associated with various weights, depending on the category or label for the example, as explained below. While process 500 described below describes web pages in a domain, it is understood that process 500 operates on any set of similarly-structured documents, including non-web based documents associated with a particular document source.

The system may receive a document set and an entity type (or types) that the wrapper will apply to (505). In some implementations, a vertical may also be provided. The vertical represents domains for a similar topic, such as sports, movies, restaurants, etc. In the example below the document set is a domain, but process 500 applies to other kinds of document sets with documents of similar structure. The system may use the domain and the entity type to identify training pages in the vertical (510). Each training page may be associated with a respective subject entity, when the training pages are single entity profile pages. As discussed above, the profile pages may be a web page, or may be a section of a web page. For example, a movie wiki may include a table-like structure for movies, with each row (or a collection of rows) representing a single movie. Each row (or collection of rows) can be considered a different training page. Thus, for example, each row of FIG. 12 may be considered a different training page. For example, the system may crawl the domain to determine each document (web page) for the domain. The pages associated with a domain may include single entity profile pages as well as other pages. The system may use a heuristic to eliminate non-profile pages and to determine which of the remaining pages have a subject entity that exists in the knowledge base, as explained in more detail in FIG. 6. Pages associated with the domain that are profile pages for an entity that exists in the knowledge base are training pages. The system may then inspect each training page and identify target objects found in the web page, or in other words in the content of the web page (515). Target objects can include entities, names, and single-value attributes, such as dates, measures (height, weight, etc.), etc. The single-value attributes are attributes of an entity (e.g., a particular person's birth date) that can have one value per entity. For example, a person may have two phone numbers but may only have one birth date. Sometimes single-value attributes can also be referred to as entities. Entity linking using natural language processing tools may be used to identify the target objects. An example of natural language processing tools is the Stanford Core NLP package, available at http://nlp.stanford.edu/software/corenlp.shtml. As indicated above, step 515 may be performed on each training page. In other words, step 515 may result in a subject entity and corresponding target objects for each training page.

The system may use the subject entity and target objects and find paths in the knowledge base that connect the subject entity to any of the target objects (520). The system may perform this for each training page (e.g., finding paths from each subject entity to corresponding target objects). In some implementations the path may directly connect the subject entity to a target object. In some implementations, the path may have a length of two. The paths may thus represent predicates from the knowledge base. The paths represent seed facts or, in other words, seed predicates. Because the system identifies seed predicates for each training page, and repeats step 520 for all training pages for a domain, the system generates a set of seed predicates. In some implementations, the system may reverse or combine steps 515 and 520. For example, the system may use paths in the neighborhood of the subject entity to identify target objects in the training document. For example, the natural language processing techniques used in entity linking may not identify or resolve some target objects in the document. To create a more robust extraction system, the system may start from the subject entity in the knowledge base and use string matching on the names of relationships in the knowledge base that also appear in the training page to identify target objects in the training page that may not have been tagged as an target object originally. Thus, the system may use the paths to find target objects, combining steps 515 and 520.

The system may filter the set of seed predicates to eliminate those that are outliers (525). For example, if a seed predicate does not occur with sufficient frequency in the set of training pages, the system may remove the seed predicate from the set. In other words, if a particular seed predicate fails to occur in a minimum percentage of the training pages, the system may drop the particular seed predicate. This ensures that the seed predicates in the set of seed predicates are consistently expressed on the training pages. In some implementations, the system may also compute observed functionality across all training pages. Observed functionality occurs when the same seed predicate occurs once per subject entity. In other words, the seed predicate has a one-to-one relationship with across all (or most of) the training pages. This information can help select extracted facts and control for noise, as explained in more detail below. In some implementations, the filtering of paths may be performed across a vertical. As explained above, a vertical is a collection of domains that all have common subject matter. The seed facts may, thus, be similar across the set of domains. Accordingly, if a seed fact does not occur frequently enough in the domain, it may still occur with sufficient frequency in the training pages of all domains for the vertical.

The system may also optionally filter the training pages (530). Some of the training pages may be noisy and unlikely to be true training pages. The system may identify a training page as noisy when the training page has few of the seed paths for the entity. Few may be determined as a percentage of the seed predicates. For example, if a training page only includes 20% of the possible seed predicates, the system may consider the training page noisy. The system can also filter training pages based on the absence of key attributes. For example, in some implementations, the system may require a birth date attribute for a person entity, and if a training page lacks the birthdate it may be considered noisy. The system may remove the noisy training page from the set of training pages. In other words, the noisy training page may not be annotated and used to train the extraction model.

The system may then obtain facts (tuples) from the knowledge base that include the subject entity as the subject and any of the seed predicates as the predicate (535). This ensures that the system has all relevant facts for the subject entities, relevance being determined by the seed predicates. This information can assist the system in identifying and labeling training examples (540). Process 500 then ends, having generated potentially several thousand training examples for use in wrapper induction or training an extraction engine for the domain.

Figure 6:
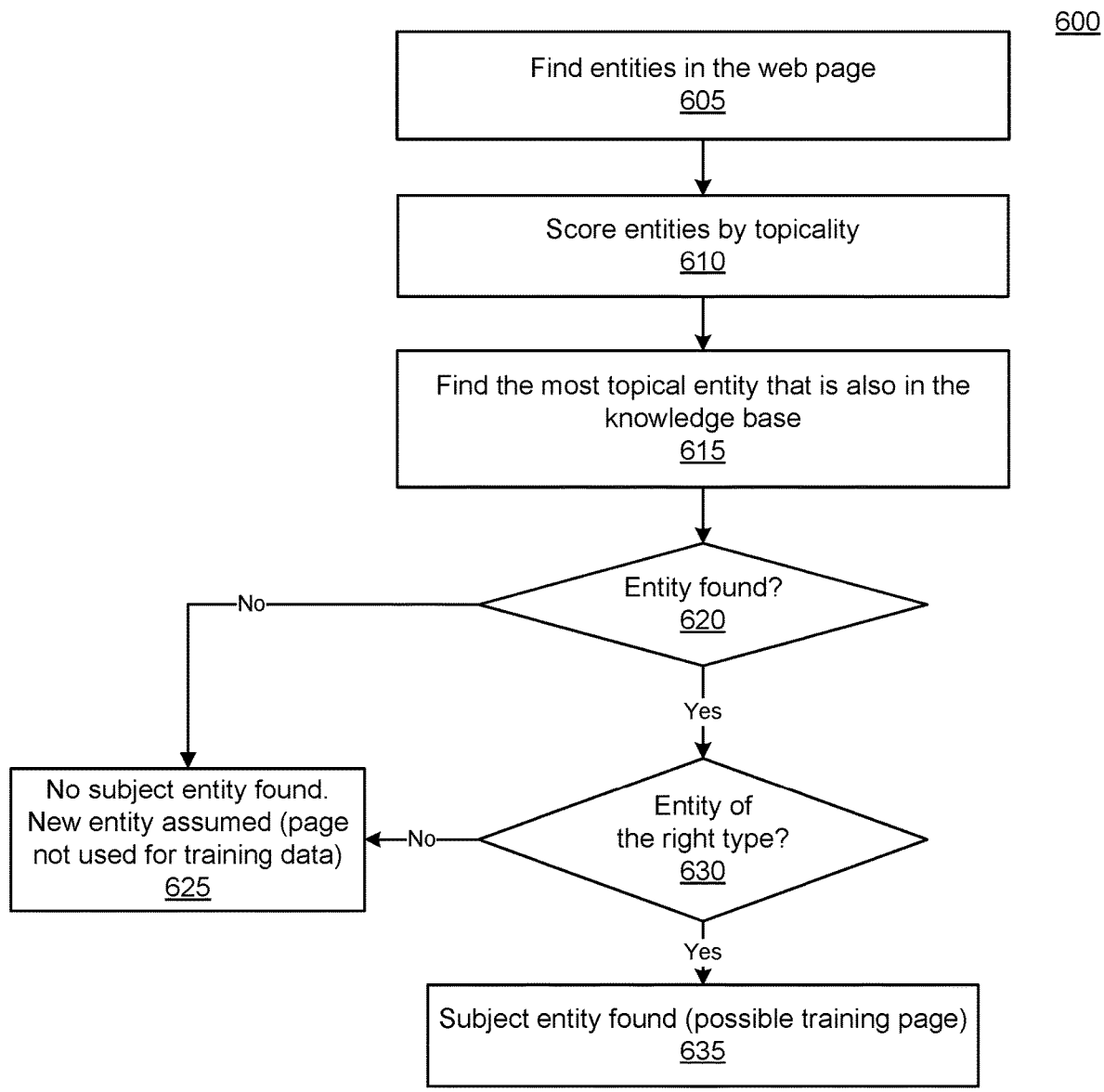
FIG. 6 illustrates a flow diagram of an example process for identifying training pages and their respective subject entities, in accordance with disclosed subject matter.

FIG. 6 illustrates a flow diagram of an example process 600 for identifying training pages and their respective subject entities, in accordance with disclosed subject matter. Process 600 may be performed, for example, as part of step 510 of FIG. 5. Process 600 may use a knowledge base to identify pages in a domain that have a subject entity that exists in the knowledge base. The pages identified by process 600 are training pages for the domain. The system may then use the training pages to identify seed facts for the domain and to annotate the training pages with positive and negative training examples, as described above. Process 600 is illustrated for a single page in the domain but the system may execute process 600 for each page in the domain to determine which pages are possible training pages. Although the system may identify a page as a training page via process 600, the page may be filtered out at a later stage. Thus, the training pages identified by process 600 may also be referred to as potential training pages or possible training pages.

First, the system may perform entity linking on the content of the web page (605). As discussed above, the system may use any conventional entity linking (entity identification) techniques. Entity linking uses natural language processing tools, such as part of speech tagging, dependency parsing, noun-phrase extraction, and coreference resolution to match a mention with an entity in the knowledge base. The mention can be text based and, in some implementations, may be image based. For example, some knowledge bases may include images associated with an entity and entity linking may be accomplished via image similarity. As part of entity linking, the system may associate a confidence score with each entity found in the page. The confidence score represents how certain the system is that the entity in fact corresponds with the text or image that represents the entity mention. For example, the text Jaguar may refer to either the car, the animal, or the operating system. The entity linking process uses context to determine which entity is the most likely match, and the confidence in the match may be reflected by the confidence score.

The system may score the entities by topicality (610). In other words, the system may calculate a topicality score for each entity. The system may use features such as location of the entity mention in a title, location of the entity mention in a URL, the font size used for the entity mention, the number of times the entity is mentioned on the page (entity frequency), the presence of the entity mention in anchor text from other websites to the webpage, relationship connectedness in the knowledge base, etc. The system may consider the main or subject entity to be the most topical entity, or in other words the entity with the highest topical score. The system may then attempt to locate the subject entity in the knowledge base (615) using conventional techniques. As one example, the knowledge base often has one or more descriptions for an entity that can match the entity mention in the web page. If an entity in the knowledge base does not match the main entity on the web page (620 No), the web page is not a training page (625). In other words, the web page is not used for wrapper induction but can be used by the wrapper to extract new facts.

If an entity matching the main entity is found in the knowledge base (620, Yes), the system may determine whether the entity is of the correct type (630). For example, if the entity type is a person, but the main entity for the web page is a movie, the main entity is not the right type (630, No), and the page is not used as a training page (625) but may be used for extraction later, or may be used in a test set. If the entity in the knowledge base is of the expected type (630, Yes), the page is a possible training page with a main entity of the right type. Of course, the training page can be filtered out at a later stage, for example because it does not include a sufficient number of seed facts or includes a sufficient number of facts that disagree with the facts in the knowledge base for the entity. This can occur, for example, when a new entity (e.g., not known in the knowledge base) has the same description as a known entity. As discussed above, the system may discover that all facts or nearly all facts on the page are negative examples and remove the page from the training set as it likely includes a new entity and not information on a known entity. Process 600 then ends.

Figure 7:
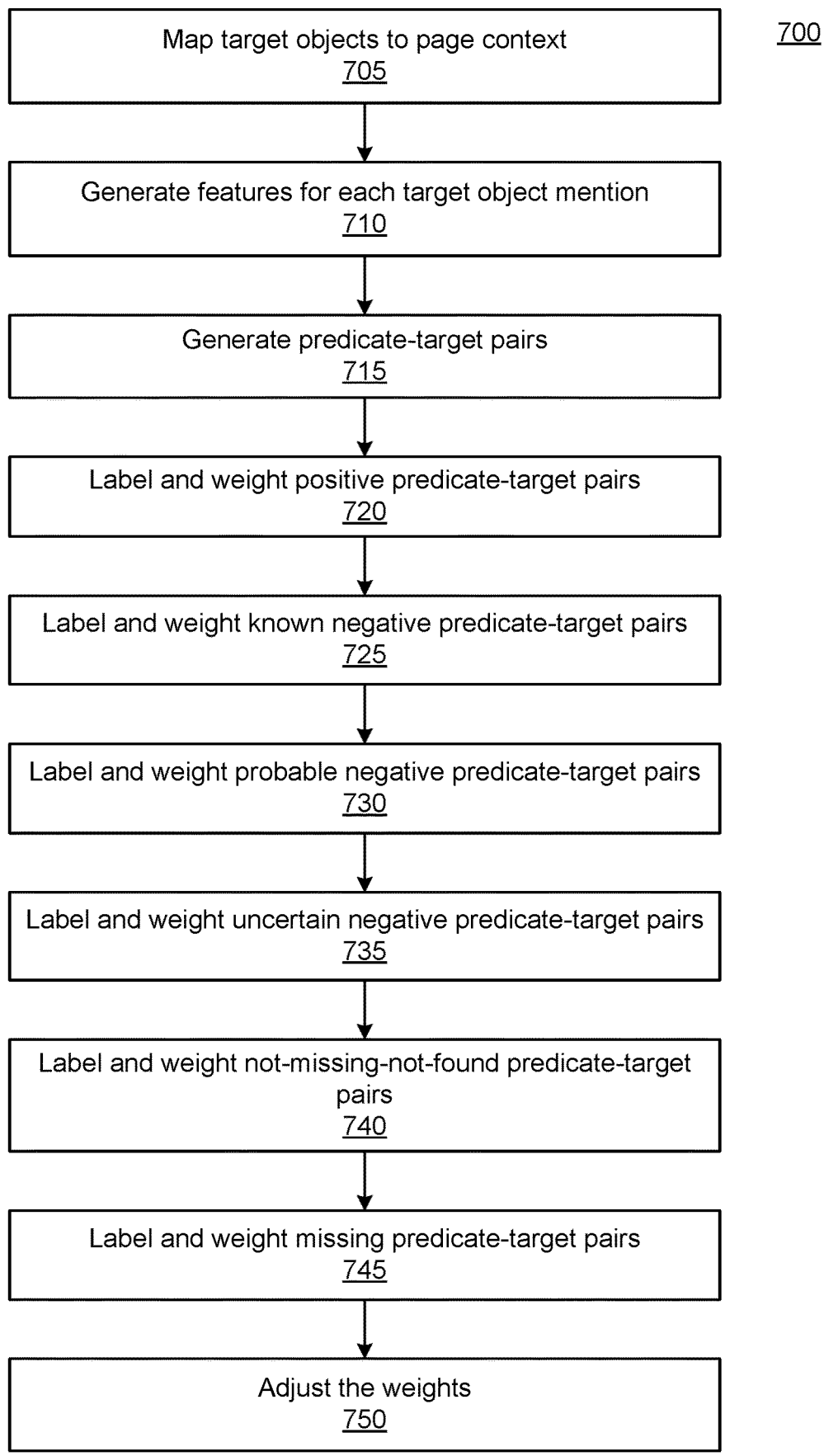
FIG. 7 illustrates a flow diagram of an example process for identifying and labeling training examples in training pages for wrapper induction, in accordance with disclosed subject matter.

FIG. 7 illustrates a flow diagram of an example process 700 for identifying and labeling training examples in training pages for wrapper induction, in accordance with disclosed subject matter. Process 700 may be performed, for example, as part of step 540 of FIG. 5. Process 700 may use facts in a knowledge base to automatically label training examples in a training page. The training examples can be positive or negative, and the negative examples can be one of several categories, each category having a different weight. The weight represents the confidence or uncertainty that the example is actually negative. Process 700 is illustrated for a single training page but the system executes process 700 for each training page.

Process 700 starts by getting context from the page for each target object found in the page (705). In other words, the system may map the target object to the place or places in the web page where the target object occurs. As indicated above, the target object may occur in multiple locations within the training page, and may be associated with a confidence score for the location. Each location is considered a mention or instance of the target object. Each mention or instance is also associated with context specific for that mention. The context includes words surrounding the mention, the portion of the DOM the instance occurs in, etc. As a result of mapping target objects to locations, each mention in the training page may have more than one target object mapped to it. This may occur, for example, when more than one target object has the same text description. The system may generate features for each of the mentions (710). In some implementations, the features may include the mention string itself, or in other words, the text that represents the instance. The features may also include the text that occurs before and after the mention string. For example, the system may include a quantity of characters that occur before the mention text and a quantity of characters that occur after the mention text. As examples, the quantity may be 80 characters, 40 characters, 100 characters, etc. Another feature the system may extract is the DOM node for the mention. This can include the top-down and bottom-up paths (XPath) from the root or other stable node in the DOM, the element ID and its class. In some implementations, the system may also extract the DOM siblings, for example, the left and leftmost sibling and the left and leftmost table row siblings of the object is in a table. In some implementations, the system may use CSS (cascading style sheet) style features, such as the name, class, identifier, and font information as features. In some implementations, the system may use table position (where applicable), such as first row, a particular column, etc., as a feature. In some implementations, the system may use features of the text, such as size, alignment within the surrounding block element, font, capitalization, etc. In some implementations, the system may use mention features, such as the size and/or length of the mention, word embeddings from word2vec, the entity type of a target object, etc. Of course, these are given as non-limiting examples and the system may use other features not listed.

The system may generate predicate-target object pairs using the mapping and features (715). As explained above, the system may determine a set of seed predicates that apply to the document source. The system may pair each seed predicate with a target object identified in a training page. Because each target object is also mapped to one or more instances or mentions, and each mention has a set of features, the outcome of generating the predicate-target object pairs may be a training example in the form <subject, predicate, target, Features> where subject is the main entity, predicate is one of the seed predicates for the document source, target is a target object and Features are the features associated with a particular mention. Thus, for example, if a training page has four seed predicates, a target object that occurs in two different mentions, generating the predicate-target object pairs may result in eight training examples (i.e., the four seed predicates paired with the target object at each of the two mentions). Some of the examples may not map to a mention. For example, the system obtains all seed facts from the knowledge base known about a subject entity (e.g., as part of step 535 of FIG. 5). The objects of these facts may not exist on the web page. Thus, a training example may not be associated with a mention or with a set of features. Such examples are used, as explained below, in categorizing other examples and in training the model. In some implementations, the system may filter out any training examples where the target object does not fit the type expected by the seed predicate. For example, some seed predicates may expect a date and the system may discard any pairings where the target object is not a date. Similarly, some seed predicates may expect a person, and the system may filter out any pairs where the target object is not a person. In some implementations, the system may keep such pairs but categorize them as not applicable or irrelevant.

The system may categorize the training examples, assigning each example to a category. The system may first find and identify positive examples (720). Positive examples represent examples where the subject-predicate-object of the example match a fact in the knowledge base. Such examples are categorized as positive and given a highest weight, for example 1.0. In some implementations, this weight can be adjusted based on features for a mention. For example, a training page may include the text "India", which can refer to either the country or the cricket team. The knowledge base may include two facts for the subject entity of the training pages, one being a born in relationship with the country of India, and another being a played in relationship with the team. Both facts are in the knowledge base, but the particular mention can only be a positive example of one of the two facts. Thus, for example, if the text appears in a position where a team name is expected, the played in-India pair may be marked as positive and the born in-India pair may not. In some implementations, adjusting may occur after processing all training pages in the document source, so that the system learns which types of entities occur in various locations. In some implementations, the system may adjust the weight based on the particular vertical or document source. Thus, for example, the team entity may be given a boost in a sports vertical, where otherwise the country would be the more likely interpretation. Once labeled, the training example can be expressed as <subject, predicate, target, Features, Category> where category for the positive example is "Positive" or some value representing a positive example. Once an example has been labeled, it is not considered again (e.g., a Positive example does not later change its category to one of the negative labels). Once positive examples are identified, the system may find and label known negative examples (725). Known negative examples are examples where the subject-predicate-object directly contradicts a fact in the knowledge base. For example, some predicates are functional or single value, in that these predicates can only have one target object (a one-to-one relationship). Examples of such predicates are birthdates, gender, etc. If an example includes one of these predicates paired with a target object that does not match the target object in the knowledge base, the system categorizes the example as Known Negative and may assign a highest weight to the example, for example 1.0.

The system may then find and label probable negative examples (730). A probable negative exists where the page has two positive examples, one for predicate-target object pair p1-o1 and another for predicate-target object pair p2-o2. When p1 and p2 are distinct (not equal) and o1 and o2 are distinct, the system assumes that any pairing of p1 and o2 is a negative example and a pairing of p2 and o1 is a negative example. While this assumption may not always be true, it is a reasonable guess. In some implementations, probable negatives are given a high weight. In some implementations the weight may be 1.0.

The system may then find and label uncertain negative examples (735). Uncertain negative examples are an example of a weak negative example that applies to non-functional or one-to-many predicates. With such predicates a subject entity may be linked to many objects via this predicate. An example of such non-functional predicates are plays for, which represents the teams a person has played or is playing for or acted in, which represents the movies an actor has acted in. When an instance (a mention) is not associated with an example that is positive (e.g., another predicate represents a positive example for this instance) and some other instance is labeled as positive for the predicate on the training page, the system may label the example as an uncertain negative. For example, in FIG. 2, the knowledge base may include facts for three of the five teams listed on the page. Thus, the three known teams may be labeled as positive examples for the predicate plays for. The remaining two teams, which are not known to the knowledge base, may be categorized as an uncertain negative, as the example may actually be a correct fact. Because uncertain negative examples are weak they may be given a lower weight. In some implementations, the weight may depend on the completeness of the knowledge base. For example, if the knowledge base includes n instances of a predicate for the subject entity, the weight of the uncertain negative may increase with n. In some implementations, this may be expressed as $1-e^{-cn}$, where c is low (e.g., 0.2).

The system may then look for and categorize not-missing-not-found predicate-target pairs (740). Not-missing-not-found predicate-target pairs represent facts known in the knowledge base for the subject entity that are not associated with a mention on the page. This is another example of a weak negative, as it is possible that the fact is expressed on the page but entity linking errors or aliasing problems may result in not identifying the target object. Such examples may be given a small weight, such as 0.1. Any remaining examples the system may categorize as missing (745). Typically, the remaining examples are functional predicates because the multi-valued predicates are addressed by the other uncertain negative categories. For example, a subject entity may lack a birth date in the knowledge base, the system may pair each date with the born on predicate (when this is a seed fact). Such examples are weak negatives. The weight assigned to such an example may vary. For example, it may be proportional to the number of times the missing fact for that predicate occurs on a page (e.g., 1/M where the fact occurs M times). In some implementations, the weight may be based on vertical specific logic (e.g., how much it deviates from an overall distribution for the vertical), or even how compatible the fact is with positive facts (e.g., a person cannot be born after their date of death). In some implementations where the system has not filtered out examples where the target object does not match the type expected by the predicate and has not already labeled these pairs as not applicable, the system may give such pairs the label of not applicable prior to labeling remaining pairs as missing.

Finally, in some implementations, the system may adjust the weights assigned to examples (750). In some implementations the adjustment may be based on the confidence score associated with the target object in the example. As indicated above, each target object may be given a confidence score as part of the entity linking step. In some implementations, the weight of an example may be multiplied by the confidence score for the target object.

In some implementations, the system may normalize the weight of a fact that appears multiple times in the training page. As indicated above, each instance of a target object may be associated with a confidence score from the entity linking. Thus, when a target object appears multiple times, each instance may have a different confidence score, but each instance will have the same weight w. The system may normalize the weight w across all the instances, for example, by using the following formulae:

$$w_1 = \frac{wc_1}{c_1 + c_2}$$

and $$w_2 = \frac{wc_2}{c_1 + c_2}$$

where $c_1$ is the commence score for the first instance, $c_2$ is the confidence score for the second instance and the first formula is used to adjust the weight $w_1$ of the first instance and the second formula is used to adjust the weight $w_2$ of the second instance.

In some implementations, the system may adjust the weights based on "approximate" or fuzzy matching for numeric and location values. For example, the system may use Geographic containment. Geographic containment may boost the weight of a negative fact (make it a weaker negative) when the fact is geographically similar. For example, if the knowledge base includes the fact <born-in chicago> and the training page includes <born-in IL>, the system may make the fact a weaker negative. As another example, the system may use numeric mismatch for single-value or functional predicates, especially those that can change slightly over time or vary slightly in how they are reported, such as height and weight. Thus, the system may use a fuzzy matching technique. For example, the system may match a numeric value height 121 cm with 122 cm, but not 135 cm. In some implementations, the system may use a simple percentage based matching (within a given percentage, say +/−10%). In some implementations, the system may also leverage vertical-specific population distribution to create tighter bounds. For example, to estimate differences between actual vs. expected attribute values where the system has high confidence in the values. The resulting positive (or negative) examples can be weighted by their specificity proportionately to how close they match the observed knowledge base values.

Process 700 then ends, having automatically generated positive and negative training examples for the training page. Of course, the system may repeat process 700 for each training page in the document source (and for each source across the vertical).

Figure 8:
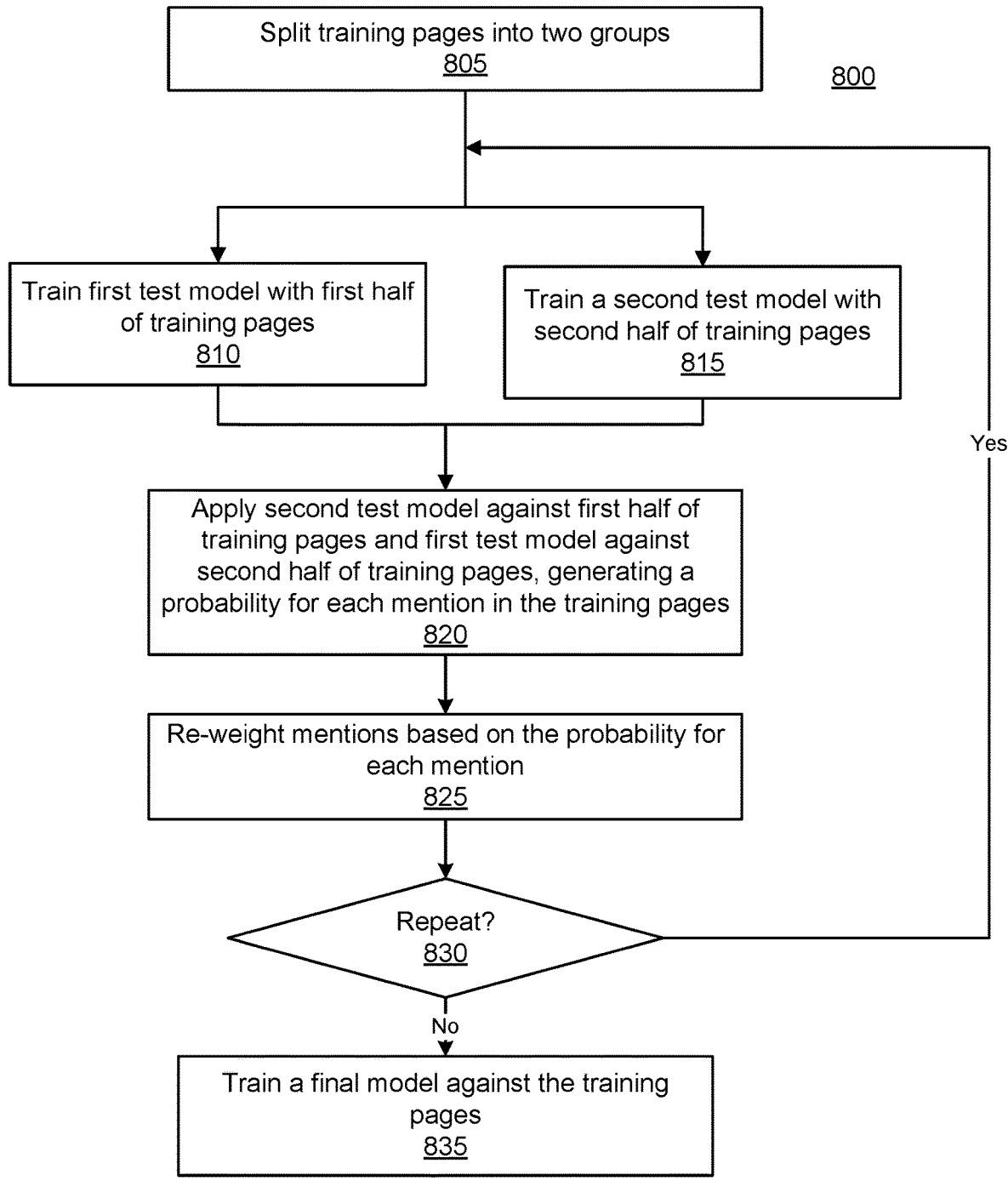
FIG. 8 illustrates a flow diagram of an example process for iterative reweighting negative training examples in a bootstrapped training process, in accordance with disclosed subject matter.

FIG. 8 illustrates a flow diagram of an example process 800 for iterative reweighting negative training examples in a bootstrapped training process, in accordance with disclosed subject matter. Process 800 may be performed, for example, by a wrapper induction engine in an automatic wrapper induction system, such as system 100 of FIG. 1. In some implementations, process 800 may be performed as part of step 410 of FIG. 4. Process 800 uses a bootstrapped training process to reweight negative training examples in order to increase recall in the model. In some instances, the bootstrapped training process can improve recall by 5-10%, especially for multi-valued attributes (e.g., a list of all teams a player has ever played for). The reweighting occurs over a predetermined number of training and application cycles. The reweighted examples are then used to train the final extraction model.

Process 800 begins with the system dividing the annotated training pages into groups or portions (805). In the example of FIG. 8 the system divides the training pages into two portions, a first portion and a second portion. However, in some implementations, the system may divide the training pages into three, four, or more portions Thus, process 800 is understood to represent a k-fold cross-validation, and is not limited to the number of portions illustrated. The system may then use the first portion to train a first test extraction model (810) and use the second portion to train a second test extraction model (815). The system may then apply the second test model to the first portion of the pages and apply the first test model to the second portion of the pages (820). In applying the model, the system generates a probability or confidence for each mention. The system may use the generated probabilities to reweight the examples (825). For example, if a born in-India predicate-target object pair (i.e., example) occurs three times on the page, each instance receives a probability. If the probability for a first mention is less than or equal to 50% but the probability for another mention is greater than 50%, the system may adjust the weight of the first mention to zero. This is because the pair has a negative probability and another mention on the training page is more relevant (i.e., has a positive probability). If the probability of the first mention is greater than 50% and the second mention is also greater than 50%, the system may normalize the weights of all positive (greater than 50%) examples. In this case any negative (less than or equal to 50%) examples are set to zero. If no mention is positive, the system may normalize the weight over all mentions. In some implementations, this reweighting step may be expressed as $$w_i = \begin{cases} 0 & \text{if } p_i \leq 0.5 \text{ and } \exists\, p_j > 0.5 \\ \dfrac{p_i}{\sum_{j: p_j > 0.5} p_j} & \text{if } p_i > 0.5 \text{ and } \exists\, p_j > 0.5 \\ \dfrac{p_i}{\sum_j p_j} & \text{otherwise} \end{cases}$$

where $w_i$ is the weight for the instance i, and $p_i$ is the probability for the instance i of the predicate-target object pair and $p_j$ is the probability of another instance j of the predicate-target object pair. The reweighting allows less relevant mentions to fall out.

The system may then determine whether to repeat the training and model application steps (830). The system may repeat the steps a predetermined quantity of times. In some implementations, the predetermined quantity is two. If the predetermined quantity has not been reached (830, Yes), the system may use the reweighted training pages to train the model and apply the trained model, as explained above. If the predetermined quantity has been met (830, No), the system may use the reweighted examples in the training pages to train a final model (835). In training the final extraction model the system may use all the annotated training pages. Process 800 then ends and the final extraction model is ready to be applied to other similarly structured pages in the domain.

Figure 9:
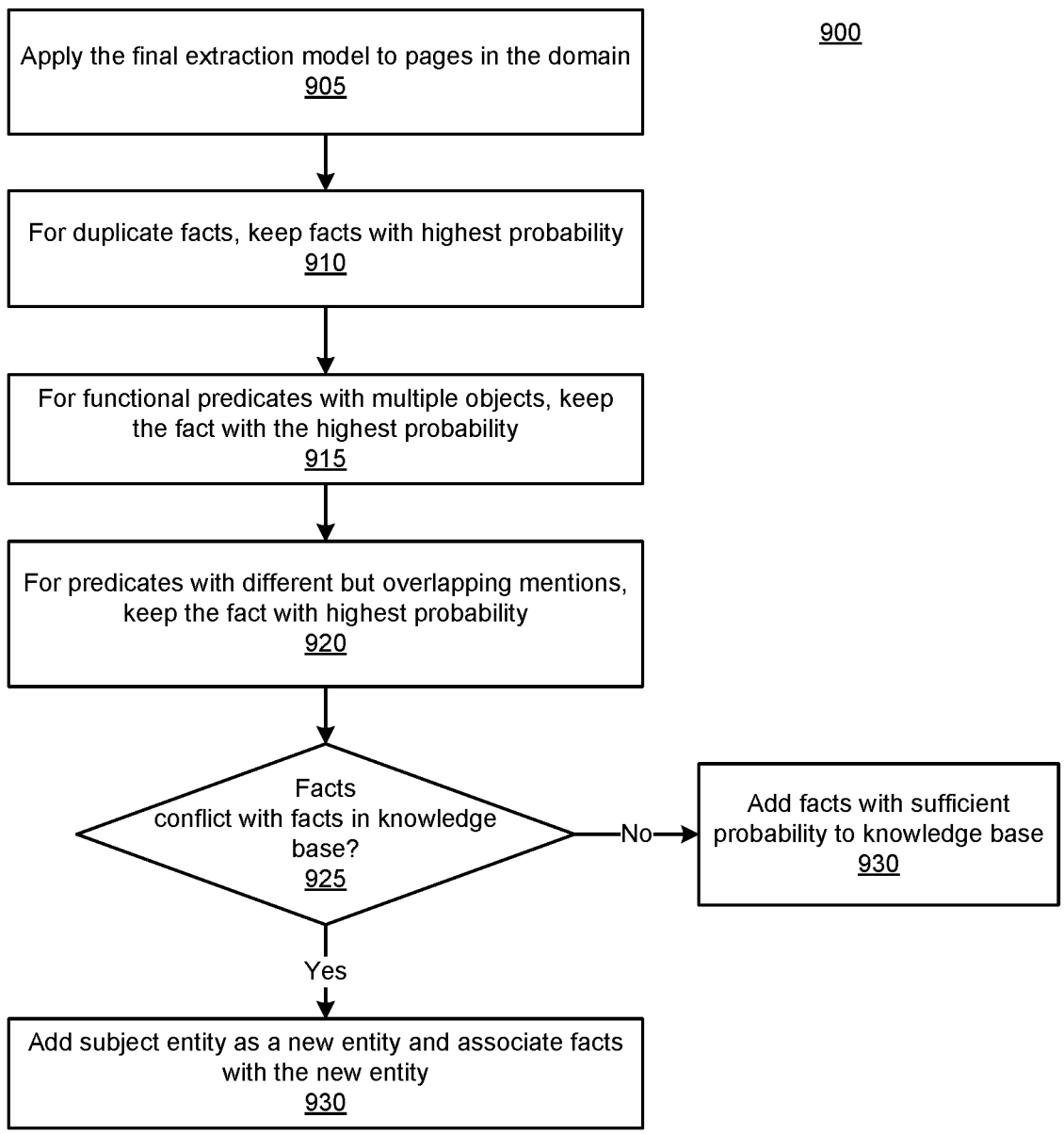
FIG. 9 illustrates a flow diagram of an example process for removing errant facts extracted using the wrapper, in accordance with disclosed subject matter.

FIG. 9 illustrates a flow diagram of an example process 900 for removing errant facts extracted using the wrapper, in accordance with disclosed subject matter. Process 900 may be performed, for example, by a missing fact generation engine in an automatic wrapper induction system, such as system 100 of FIG. 1. In some implementations, process 900 may be performed as part of step 415 of FIG. 4. Process 900 demonstrates how the system may use domain knowledge and information about the knowledge base schema to refine extracted facts and correct errors in the entity linking. Process 900 also uses statistics of observed predicate functionality to remove errant facts. Thus, process 900 helps ensure that facts extracted using the wrapper are suitable for insertion into the knowledge base.

Process 900 may begin by applying the wrapper (or final trained extraction model) to the pages in the domain (905). In some implementations, the pages may be the training pages and other pages that have a structure similar to the training pages. In some implementations, the pages may be all pages associated with a domain, or in other words, all pages that satisfy a regular expression used to represent the domain. The application of the wrapper to the pages generates a probability for various facts identified in the pages, the fact being represented by a subject-predicate-object pairing. The system may group predictions from the mention-level to the object level by taking the maximum probability across all identical facts (910). The system may also identify any functional (i.e., one-to-one) predicates. If there are multiple facts with this predicate for the same subject, the system may keep the fact with the highest probability (915). In some implementations, the system may identify functional predicates by computing statistics from the seed fact identification process (e.g., process 500). In other words, some predicates may be non-functional in the knowledge base, but the system may determine that the predicate is functional within the domain. Thus, the system may consider the predicate as functional for the domain only, eliminating facts with the lower probabilities to increase the chance that the system saves the correct fact.

The system may also use a fact's probability to select from between facts where the subject and predicate are the same, but the object differs but the different objects are linked to a textual mention that overlaps (920). For example, the text "Bob was born in South Africa" may lead to the two facts <Bob, born in, South Africa> and <Bob, born in, Africa> (the latter because the entity linking views South as an adjective of Africa, not as a noun phrase. If one fact has a higher probability than the other, the system may discard the one with the lower probability. In the event of a tie, the system may select the fact that represents the longest text span.

The system may then determine whether the facts for a subject entity conflict with facts in the knowledge base (925). When a majority of the facts actually conflict (925, Yes), the system may have incorrectly tagged the subject entity as an existing entity rather than a new entity. For example, a lesser-known sports figure may have the same name as a well-known sports figure. The well-known sports figure may be represented by an entity in the knowledge base while the lesser-known sports figure is not. If the system incorrectly identifies a mention of the lesser-known sports figure with the well-known figure, the system can catch this misidentification by checking the facts in the knowledge base. If the facts (or a majority of the facts) contradict what is known about the subject entity (925, Yes), the system may assume the subject is actually a new entity and proceed to add the new entity to the knowledge base and add the extracted facts to the new entity. If the knowledge base does not include an entity matching the subject entity, or if the facts for a known subject entity do not conflict (925, No), the system may add the facts, including adding a new subject entity when needed) to the knowledge base. In some implementations, the system may only add facts that have a positive probability (e.g., greater than 50%). In some implementations, the threshold for adding a fact may be even higher, for example, 70%. Process 900 then ends, having extracted new facts from the web pages in the domain using a wrapper trained using automatically annotated training examples. Of course the system may perform process 900 on a periodic basis. For example, as new pages are discovered (e.g., identified during a web crawling process), the system may apply the wrapper to the newly discovered pages. Thus, the system may continue to add facts to the knowledge base as additional semi-structured pages are added to the domain.

FIG. 10 shows an example of a generic computer device 1000, which may be system 100, and/or client 170 of FIG. 1, which may be used with the techniques described here. Computing device 1000 is intended to represent various example forms of computing devices, such as laptops, desktops, workstations, personal digital assistants, cellular telephones, smart phones, tablets, servers, and other computing devices, including wearable devices. The components shown here, their connections and relationships, and their functions, are meant to be examples only, and are not meant to limit implementations of the inventions described and/or claimed in this document.

Computing device 1000 includes a processor 1002, memory 1004, a storage device 1006, and expansion ports 1010 connected via an interface 1008. In some implementations, computing device 1000 may include transceiver 1046, communication interface 1044, and a GPS (Global Positioning System) receiver module 1048, among other components, connected via interface 1008. Device 1000 may communicate wirelessly through communication interface 1044, which may include digital signal processing circuitry where necessary. Each of the components 1002, 1004, 1006, 1008, 1010, 1040, 1044, 1046, and 1048 may be mounted on a common motherboard or in other manners as appropriate.

The processor 1002 can process instructions for execution within the computing device 1000, including instructions stored in the memory 1004 or on the storage device 1006 to display graphical information for a GUI on an external input/output device, such as display 1016. Display 1016 may be a monitor or a flat touchscreen display. In some implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk. In some implementations, the memory 1004 may include expansion memory provided through an expansion interface.

The storage device 1006 is capable of providing mass storage for the computing device 1000. In one implementation, the storage device 1006 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 1004, the storage device 1006, or memory on processor 1002.

The interface 1008 may be a high speed controller that manages bandwidth-intensive operations for the computing device 1000 or a low speed controller that manages lower bandwidth-intensive operations, or a combination of such controllers. An external interface 1040 may be provided so as to enable near area communication of device 1000 with other devices. In some implementations, controller 1008 may be coupled to storage device 1006 and expansion port 1014. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1030, or multiple times in a group of such servers. It may also be implemented as part of a rack server system. In addition, it may be implemented in a personal computer such as a laptop computer 1022, or smart phone 1036. An entire system may be made up of multiple computing devices 1000 communicating with each other. Other configurations are possible.

FIG. 11 shows an example of a generic computer device 1100, which may be system 100 of FIG. 1, which may be used with the techniques described here. Computing device 1100 is intended to represent various example forms of large-scale data processing devices, such as servers, blade servers, datacenters, mainframes, and other large-scale computing devices. Computing device 1100 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 1100 may include any number of computing devices 1180. Computing devices 1180 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 1180a includes multiple racks 1158a-1158n. Each rack may include one or more processors, such as processors 1152a-1152n and 1162a-1162n. The processors may include data processors, network attached storage devices, and other computer controlled devices. In some implementations, one processor may operate as a master processor and control the scheduling and data distribution tasks. Processors may be interconnected through one or more rack switches 1158, and one or more racks may be connected through switch 1178. Switch 1178 may handle communications between multiple connected computing devices 1100.

Each rack may include memory, such as memory 1154 and memory 1164, and storage, such as 1156 and 1166. Storage 1156 and 1166 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 1156 or 1166 may be shared between multiple processors, multiple racks, or multiple computing devices and may include a computer-readable medium storing instructions executable by one or more of the processors. Memory 1154 and 1164 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 1154 may also be shared between processors 1152a-1152n. Data structures, such as an index, may be stored, for example, across storage 1156 and memory 1154. Computing device 1100 may include other components not shown, such as controllers, buses, input/output devices, communications modules, etc.

An entire system, such as system 100, may be made up of multiple computing devices 1100 communicating with each other. For example, device 1180a may communicate with devices 1180b, 1180c, and 1180d, and these may collectively be known as system 100. As another example, system 100 of FIG. 1 may include one or more computing devices 1100. Some of the computing devices may be located geographically close to each other, and others may be located geographically distant. The layout of system 1100 is an example only and the system may take on other layouts or configurations.

In one aspect, a method includes identifying, from a set of semi-structured web pages, a training set of the semi-structured web pages, a semi-structured web page in the training set being a training page and having a subject entity that exists in a knowledge base. The method also includes, for each training page in the training set, identifying target objects in the training page, identifying predicates in the knowledge base that connect the subject entity of the training page to one of the target objects identified in the training page, and annotating the training page. Annotating the training pages includes, for at least some target objects identified in the training page, generating a feature set for a mention of the target object, generating predicate-target object pairs for the mention, and labeling each predicate-target object pair with a corresponding example type and weight. The method also includes training, using the annotated training pages, a machine-learning model to extract new subject entities and new facts from the set of semi-structured web pages.

This and other aspects can include one or more of the following features. For example, the model may be a final model and training the final model to extract new subject entities and new facts includes: dividing the training pages into one of a first set and a second set, training a first model using the first set, training a second model using the second set, running the first set through the second model to obtain probabilities for the predicate-target object pairs in the first set, running the second set through the first model to obtain probabilities for the predicate-target object pairs in the second set, adjusting respective weights of the predicate-target object pairs based on the probabilities, and training the final model using the training set with adjusted weights. In some implementations, the method may include repeating the training, running, and adjusting a second time prior to training the final model. As another example, identifying predicates in the knowledge base can include clustering the predicates found across the set of training pages and eliminating predicates that fail to occur a minimum number of times.

As another example, labeling each predicate-target object pair may include determining whether the subject entity for the training page is linked to the target object by the predicate in the knowledge base, labeling the predicate-target object pair as a positive example with a highest weight when the subject entity is linked to the target object by the predicate, and labeling the predicate-target object pair as one of a plurality of negative examples when the subject entity is not linked to the target object by the predicate. In some implementations, when the predicate is a functional predicate, the method may also include determining that the knowledge base includes a target object linked by the predicate to the subject entity that differs from the target object in the predicate-target object pair and labeling the predicate-target object pair as a negative example with a highest weight. In some implementations, the method may also include determining that the knowledge base includes the target object linked by a different predicate to the subject entity, which represents a different-predicate-target object pair, determining that the knowledge base includes a different target object linked by the predicate to the subject entity, which represents a predicate-different-target object pair, labeling the different-predicate-target object as a probable negative example with a high weight, and labeling the predicate-different-target object as a probable negative example with a high weight. In some implementations, the method may also include adjusting the weight of a positive example based on the feature set for the mention and/or the method may include determining that the knowledge base includes the subject entity linked by the predicate to a different target entity, the different target entity being distinct from any target objects on the training page and labeling the pairs that include the predicate as not-missing-not-found negative examples with a low weight.

In one aspect, a system includes at least one processor and memory storing a training set generation engine. The training set generation engine may be configured to identify, from a set of semi-structured web pages for a domain, a training set of the semi-structured web pages, a semi-structured web page in the training set being a training page and having a subject entity that exists in a knowledge base. The training set generation engine may also be configured to, for each training page in the training set, identify target objects in the training page, identify predicates in the knowledge base that connect the subject entity of the training page to one of the target objects identified in the training page, and annotate the training page by generating predicate-target object pairs for at least some target object mentions, wherein each predicate-target object pair is one of a positive example type, a probable negative example type or a weak negative example type. The memory may also store a wrapper induction engine configured to train, using the annotated training pages, an extractor model and a missing fact generation engine configured to use the trained extractor model on non-training pages in the domain to extract new subject entities and new facts from the set of semi-structured web pages.

This and other aspects can include one or more of the following features. For example, the missing fact generation engine may be further configured to determine a probability for a new fact and, when the probability meets or exceeds a threshold, add the new fact to the knowledge base. As another example, each semi-structured web page may be a segment of a document. As another example, generating predicate-target object pairs for at least some target object mentions can include, for a particular mention, pairing each identified predicate with the target object associated with the particular mention and, for each pairing, assigning the predicate-target object pair to a positive example when the predicate-target object pair exists in the knowledge base for the subject entity, assigning the predicate-target object pair to a probable negative example when the predicate-target object pair contradicts a fact in the knowledge base for the subject entity, and assigning the predicate-target object pair to a weak negative example otherwise.

As another example, the training set generation engine may be further configured to filter the training set to eliminate noisy training pages. In some implementations, the predicates identified in the training set are collectively seed predicates and a noisy training page fails to have a minimum of the seed predicates. As another example, the predicates identified in the training set may be collectively seed predicates and the training set generation engine is further configured to filter the seed predicates. In some implementations, a seed predicate that does not occur with sufficient frequency in the training set is excluded as a seed predicate.

In one aspect, a method includes dividing a set of training pages into a first set and a second set, training a first model using the first set, training a second model using the second set, running the first set through the second model to obtain probabilities for features in the first set, and running the second set through the first model to obtain probabilities for features in the second set. The method also includes adjusting weights of the features according to the probabilities and training a final model using the training pages with adjusted weights.

This and other aspects can include one or more of the following features. For example, a weight of a feature may be assigned based on classification of the feature as a positive example, a probably negative example, or a weak negative example. As another example, a feature may be a predicate-object pair for a mention of the object in the training page. In some implementations, adjusting the weight of a particular feature includes setting the weight of the mention to zero when there exists a second mention of the predicate-object pair that has a weight representing a positive probability and normalizing the weight of the mention otherwise.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   identifying, from a set of semi-structured web pages, a training set of the semi-structured web pages, a semi-structured web page in the training set being a training page and having a subject entity that exists in a knowledge base;
   for each training page in the training set:
      identifying target objects in the training page,
      identifying predicates in the knowledge base that connect the subject entity of the training page to one of the one of the target objects identified in the training page, and
      annotating the training page by, for at least some target objects identified in the training page:
         generating a feature set for a mention of the target object,
         generating predicate-target object pairs for the mention, and
         labeling the predicate-target object pair with a corresponding example type and weight, an initial value of the weight being based on the example type; and
   training, using the annotated training pages, a machine-learning model to extract new subject entities and new facts from the set of semi-structured web pages.

2. The method of claim 1, wherein the model is a final model and training the final model to extract new subject entities and new facts includes:
   dividing the training pages into one of a first set and a second set;
   training a first model using the first set;
   training a second model using the second set;
   running the first set through the second model to obtain probabilities for the predicate-target object pairs in the first set;
   running the second set through the first model to obtain probabilities for the predicate-target object pairs in the second set;
   adjusting respective weights of the predicate-target object pairs based on the probabilities; and
   training the final model using the training set with adjusted weights.

3. The method of claim 2, further comprising: repeating the training, running, and adjusting a second time prior to training the final model.

4. The method of claim 1, wherein labeling each predicate-target object pair includes:
   determining whether the subject entity for the training page is linked to the target object by the predicate in the knowledge base;
   labeling the predicate-target object pair as a positive example with a highest initial weight value when the subject entity is linked to the target object by the predicate; and
   labeling the predicate-target object pair as one of a plurality of negative examples when the subject entity is not linked to the target object by the predicate.

5. The method of claim 4, further comprising, when the predicate is a functional predicate:
   determining that the knowledge base includes a target object linked by the predicate to the subject entity that differs from the target object in the predicate-target object pair; and
   labeling the predicate-target object pair as a negative example with a highest initial weight value.

6. The method of claim 4, further comprising:
   determining that the knowledge base includes the target object linked by a different predicate to the subject entity, which represents a different-predicate-target object pair;
   determining that the knowledge base includes a different target object linked by the predicate to the subject entity, which represents a predicate-different-target object pair;
   labeling the different-predicate-target object as a probable negative example with a high initial weight value; and
   labeling the predicate-different-target object as a probable negative example with a high initial weight value.

7. The method of claim 4, further comprising:
   adjusting the weight of a positive example based on the feature set for the mention.

8. The method of claim 4, further comprising:
determining that the knowledge base includes the subject entity linked by the predicate to a different target entity, the different target entity being distinct from any target objects on the training page; and
labeling the pairs that include the predicate as not-missing-not-found negative examples with a low initial weight value.

9. The method of claim 1, wherein identifying predicates in the knowledge base includes:
clustering the predicates found across the set of training pages; and
eliminating predicates that fail to occur a minimum number of times.

10. A system comprising:
at least one processor; and
memory storing:
a training set generation engine configured to:
identify, from a set of semi-structured web pages for a domain, a training set of the semi-structured web pages, a semi-structured web page in the training set being a training page and having a subject entity that exists in a knowledge base, and
for each training page in the training set:
identify target objects in the training page,
identify predicates in the knowledge base that connect the subject entity of the training page to one of the target objects identified in the training page, and
annotate the training page by generating predicate-target object pairs for at least some target object mentions, wherein each predicate-target object pair is annotated as one of a positive example type, a probable negative example type, or a weak negative example type,
a wrapper induction engine configured to train, using the annotated training pages, an extractor model, and
a missing fact generation engine configured to use the trained extractor model on non-training pages in the domain to extract new subject entities and new facts from the set of semi-structured web pages.

11. The system of claim 10, wherein the missing fact generation engine is further configured to:
determine a probability for a new fact; and
when the probability meets or exceeds a threshold, add the new fact to the knowledge base.

12. The system of claim 10, wherein each semi-structured web page is a segment of a document.

13. The system of claim 10, wherein generating predicate-target object pairs for at least some target object mentions includes, for a particular mention:
pairing each identified predicate with the target object associated with the particular mention; and
for each pairing:
assigning the predicate-target object pair to a positive example when the predicate-target object pair exists in the knowledge base for the subject entity,
assigning the predicate-target object pair to a probable negative example when the predicate-target object pair contradicts a fact in the knowledge base for the subject entity, and
assigning the predicate-target object pair to a weak negative example otherwise.

14. The system of claim 10, wherein the training set generation engine is further configured to filter the training set to eliminate noisy training pages.

15. The system of claim 14, wherein the predicates identified in the training set are collectively seed predicates and a noisy training page fails to have a minimum of the seed predicates.

16. The system of claim 10, wherein the predicates identified in the training set are collectively seed predicates and the training set generation engine is further configured to filter the seed predicates.

17. The system of claim 16, wherein a seed predicate that does not occur with sufficient frequency in the training set is excluded as a seed predicate.

18. A method comprising:
dividing a set of training pages into a first set and a second set, each training page having a subject entity and a plurality of predicate-object pairs, each predicate-object pair having a weight with an initial value;
training a first model using the first set;
training a second model using the second set;
running the first set through the second model to obtain probabilities for predicate-object pairs in the first set;
running the second set through the first model to obtain probabilities for predicate-object pairs in the second set;
adjusting weights of the predicate-object pairs according to the probabilities; and
training a final model using the training pages with adjusted weights.

19. The method of claim 18, wherein the initial value of a predicate-object pair is assigned based on classification of the predicate-object pair as a positive example, a probable negative example, or a weak negative example.

20. The method of claim 19, wherein the initial value of a predicate-object pair is based on the classification.

21. The method of claim 18, wherein adjusting the weight of a particular predicate-object pair includes:
setting the weight of a first mention of an object for the particular predicate-object pair to zero when there exists a second mention of the object of the particular predicate-object pair that has a weight representing a positive probability; and
normalizing the weights of predicate-object pairs for the first mention and the second mention of the object otherwise.

* * * * *